(12) United States Patent
Minemura

(10) Patent No.: US 8,094,535 B2
(45) Date of Patent: Jan. 10, 2012

(54) OPTICAL DISK DEVICE

(75) Inventor: Hiroyuki Minemura, Kokubunji (JP)

(73) Assignees: Hitachi, Ltd, Tokyo (JP); Hitachi-LG Data Storage, Inc., Tokyo (JP)

( * ) Notice: Subject to any disclaimer, the term of this patent is extended or adjusted under 35 U.S.C. 154(b) by 1327 days.

(21) Appl. No.: 11/492,923

(22) Filed: Jul. 26, 2006

(65) Prior Publication Data

US 2007/0121463 A1 May 31, 2007

(30) Foreign Application Priority Data

Nov. 25, 2005 (JP) ................................. 2005-339615

(51) Int. Cl.
*G11B 20/10* (2006.01)

(52) U.S. Cl. .................................. 369/59.22; 369/47.53

(58) Field of Classification Search ................ 369/59.22, 369/59.16, 59.11, 59.21; 360/65; 348/606
See application file for complete search history.

(56) References Cited

U.S. PATENT DOCUMENTS

| | | | |
|---|---|---|---|
| 5,512,956 A * | 4/1996 | Yan .............................. | 348/606 |
| 6,269,062 B1 | 7/2001 | Minemura et al. | |
| 6,463,020 B2 | 10/2002 | Minemura et al. | |
| 6,618,338 B1 * | 9/2003 | Fujiwara et al. ............ | 369/59.22 |
| 6,654,325 B1 | 11/2003 | Minemura et al. | |
| 2001/0043529 A1 | 11/2001 | Minemura et al. | |
| 2002/0085463 A1 | 7/2002 | Minemura et al. | |
| 2005/0063276 A1 * | 3/2005 | Ogura ........................ | 369/59.22 |
| 2005/0128911 A1 * | 6/2005 | Miyashita et al. ......... | 369/47.53 |
| 2005/0249318 A1 | 11/2005 | Minemura | |
| 2006/0087947 A1 * | 4/2006 | Minemura et al. ......... | 369/59.22 |

FOREIGN PATENT DOCUMENTS

| | | |
|---|---|---|
| JP | 10-320777 | 12/1998 |
| JP | 2003-006864 | 1/2003 |
| JP | 2005-346897 | 12/2005 |

* cited by examiner

*Primary Examiner* — Christopher R Lamb
(74) *Attorney, Agent, or Firm* — Antonelli, Terry, Stout & Kraus, LLP.

(57) ABSTRACT

A write type optical disk device with the PRML mode allows accuracy in the trial writing to be improved accompanied with the high speed processing while assuring the readout compatibility. A readout signal that has been A/D converted at timing that interposes the edge has its phase compensated with the even numbered FIR filter. The level at the edge point and the absolute values thereof are accumulated respectively so as to provide a circuit for detecting the edge shift and jitter. Coping with the high speed processing, the edge shift of the readout signal is detected at the position where the edge shift is around zero, thus improving the accuracy in learning of trial writing.

20 Claims, 25 Drawing Sheets

CASE 1: CLOCK POINT = EDGE POINTS.
A/D SAMPLE POINTS ARE SYNCHRONOUS TO DATA EDGES

EDGE CONDITION: $y[i-1] \cdot y[i+1]) < 0$;
EDGE SLOPE: $m = (y[i+1]-y[i-1])/2$;
EDGE LEVEL: $y_e = y[i]$;
EDGE SHIFT: $ES = -y_e/m$;

CASE 2: CLOCK POINT ≠ EDGE POINTS.
A/D SAMPLE POINTS ARE HALF-CLOCK-SHIFTED TO DATA EDGES

EDGE CONDITION: $y[i] \cdot y[i+1]) < 0$;
EDGE SLOPE: $m = y[i+1] \; y[i]$;
EDGE LEVEL: $y_e = (y[i+1]+y[i])/2$
EDGE SHIFT: $ES = -y_e/m$ 2Tap 4Tap 4Tap(2)

6Tap

FIG. 6

| TAP NUMBER | TAP COEFFICIENTS | | | | | |
|---|---|---|---|---|---|---|
| | n=1 | n=2 | n=3 | n=4 | n=5 | n=6 |
| 2 | 0.5 | 0.5 | — | — | — | — |
| 4 | -0.07 | 0.57 | 0.57 | -0.07 | — | — |
| 4 (EFFECTIVE 6) | -0.03 | — | 0.53 | 0.53 | — | -0.03 |
| 6 | -0.01 | -0.06 | 0.57 | 0.57 | -0.06 | -0.01 |

FIG. 10

| | EYE PATTERN | WRITE PULSE WAVEFORM (6T) |
|---|---|---|
| DVD-R | | Pw, Pr |
| DVD-RW | | Pw, Pe, Pg |
| DVD-RAM | | Pw, Pe |

LEADING EDGE

TRAILING EDGE

READ CONDITION CALIBRATION SECTION

WRITE POWERS FOR EDGE SHIFT ADJUSTMENT (=Padj) CALIBRATION

WRITE POWER MARGIN EVALUATION AFTER THE CALIBRATION

AVERAGE EDGE SHIFTS IN CASE OF THE DVD-RAM STANDARD EQUALIZATION

AVERAGE EDGE SHIFTS IN CASE OF THEDVD-RAM STANDARD EQUALIZATION AND COMPENSATED BY A 15-TAP FIR FILTER.

| W/R SPEED | 1ST WRITE | 10 TIMES OVERWRITE |
|---|---|---|
| 6X |  |  |
| bER | < 1x10$^{-7}$ | 2x10$^{-7}$ |
| 16X |  |  |
| bER | < 1x10$^{-7}$ | 4x10$^{-7}$ |

(*) BIT ERROR RATES WERE MEASURED USING PRML CHANNEL

OPTICAL DISK DEVICE

CLAIM OF PRIORITY

The present application claims priority from Japanese application JP 2005-339615 filed on Nov. 25, 2005, the content of which is hereby incorporated by reference into this application.

FIELD OF THE INVENTION

The present invention relates to an optical disk device that generates a write mark exhibiting a physical property different from that of other portion on a recording medium to write information data thereon.

BACKGROUND OF THE INVENTION

The use of optical disk media, for example, a DVD-RAM and a DVD-RW made of a rewritable phase-change optical write material has been widely distributed. Recently a high-capacity Blu-ray Disc conforming to a recording of a high-vision broadcasting program has been commercialized using blue laser. Commercialization of the optical disk device which allows a single drive unit to write and read the information not only on the DVD but also on the Blu-ray disk is further demanded. In the case where the information data are written on the thus high density optical disk, it is essential to optimize the write laser beam power and pulse conditions, in other words, to perform so called "trial writing".

Generally quality evaluation with respect to the signal written on the optical disk has been performed using a jitter as a standard deviation of the difference between the data edge and the clock edge. A specific measurement instrument such as a jitter analyzer is required to measure the jitter value. As the jitter analyzer is too expensive to be installed in the optical disk device, an alternative indicator for the signal evaluation has been demanded.

In JP 1998-320777 A (corresponding to U.S. Pat. No. 6,269,062), the jitter value is not directly measured but evaluated equivalently by counting the number of logical pulses referred to as the error pulse generated in response to the moment when the phase difference between the data edge and the clock edge becomes equal to or greater than a predetermined value. This makes it possible to optimize the write power.

International Publication No. WO01/011614 (corresponding to U.S. Pat. No. 6,654,325) discloses the technique for trial writing on the DVD-RAM with capacity of 4.7 GB under the adaptive write pulse/power conditions (write strategy) of table reference type in accordance with the previous and subsequent space lengths and mark lengths. The error pulses are sorted in reference with the table of the write strategy for optimizing the pulse conditions of the write laser beam such that the error pulse value of the respective sections of the table is minimized. The actual sorting requires two 4×4 tables; however, because the logical pulse, that is, error pulse is used for the signal evaluation, the aforementioned sorting may be easily performed with the logical LSI.

In JP 2003-6864 A, the process based on binarization with a generally employed direct slice process as described above is further improved to perform optimization of the write conditions conforming to the binarization through Viterbi decoding. In the aforementioned process, the readout signals that have been A/D converted are sorted in accordance with the historical transition of the target signal level for Viterbi decoding. Then the phase differences between the clocks and data edges are detected, based on which the write condition optimum for Viterbi decoding is obtained.

SUMMARY OF THE INVENTION

In the aforementioned trial writing case, in response to loading of the disk into the drive unit, the write power and the pulse shape conditions are optimized in accordance with states of the disk and the drive unit. If the disk has the sector structure and allows rewriting over hundred thousand times like the DVD-RAM, the write condition may be optimized through repetitive operations of write and read as well as the access for write and read may be quickly performed. This allows the trial writing to be performed within a short period of time. Meanwhile if the disk medium allows writing only once like the DVD-R, it is difficult to calibrate the write pulse shape. Accordingly under the conditions for the write pulse shape preliminarily stored in the drive unit, the power calibration is only performed based on the ID information written on the disk.

The widely distributed DVD has been demanded to make the speed for writing and reading higher as the most important task of technical development. When the signal written on the DVD is read by the single drive unit, the influence resulting from noise may become much greater. The use of PRML (Partial Response Maximum Likelihood) mode, for example, Viterbi decoding for effectively improving the S/N ratio is necessary as the binarized mode of the readout signal alternate to the generally employed direct slice mode.

A multifunction system so called a super multi drive unit has been distributed as a mainstream memory type DVD drive unit which is capable of writing and reading the information recorded on all types of the DVD and CD media. The thus super multi drive unit stores the write pulse shape conditions at the respective write speeds for more than 100 types of optical disk media. The memory type optical disk unit including the super multi drive is expected to be remodeled within a year from the release for further higher speed and lower price as well as adaptation to the latest medium repeatedly. As the aforementioned drive unit is not preliminarily provided with the optimum write pulse information with respect to the medium, for example, the DVD-R newly manufactured after the delivery of such drive unit, thus failing to write the data in good condition. As the S/N ratio of the aforementioned drive unit is likely to be insufficient for the DVD-RAM owing to the high speed processing, the accuracy in the trial writing of the write pulse conditions may be deteriorated.

The trial writing mode requiring good write conditions to comply with the PRML mode and cope with reduction in the S/N ratio owing to the higher processing speed has been demanded.

Disadvantages in the generally employed trial writing will be described hereinafter.

At the trial writing mode as disclosed in JP 1998-320777 A and International Publication No. WO01/011614, when the phase difference between the data edge and the clock edges becomes equal to or greater than a predetermined value, the logical pulse so called error pulse is generated. Then quality of the written data may be evaluated by counting the number of the error pulses. At the trial writing mode, the error pulse is not generated at the position where the edge shift is around zero in principle. If the S/N ratio of the drive unit becomes insufficient owing to the higher processing speed, the accuracy in the trial writing may be deteriorated.

At the trial writing mode disclosed in JP 2003-6864 A, the binarized read signal is compared with the target signal of the PRML, and the trial writing is performed to minimize the difference therebetween. The advantage of the PRML mode compared with the direct slice mode is that the inter-symbol interference by the read signal is allowed, and the binarization with less error is allowed at the small S/N ratio. Meanwhile, the target signal is generated as the stack of the impluse/response to have the asymmetry of zero except a special case. The disadvantage of the PRML mode is that the difference between the read signal and the target signal becomes large if the asymmetry of the signal on the disk is not zero. In the case where the asymmetry is excessively large, the error caused by the binarizing process may become larger than that at the direct slice mode. The space portion and the mark portion of the optical disk of write type have different physical structures. The condition determined to make the jitter value minimum depending on the physical property of the recording material does not always make the asymmetry zero. The write mark portion of the recording material of the phase change type such as the DVD-RAM is formed of amorphous such that the particle size is smaller than that of crystal, resulting in reduced noise. Accordingly, in the case where the write condition in which the ratio of the amorphous to the portion of the disk is high, that is, the asymmetry becomes a relatively large positive value, the jitter value becomes minimum. FIG. 2 shows write signals written on the commercial DVD media under the condition of minimum jitter. The signal written on the DVD-RAM shows the positive asymmetry. The signal written on the DVD-R shows the asymmetry that makes the 11T mark signal larger as it goes to the rear end. If asymmetry is observed in the direction of both level and time, the trial writing at the mode where the comparison is made with respect to the target signal of PRML as disclosed in patent application Publication No. 2003-6864 may have difficulties in obtaining the optimum write condition.

Besides the case disclosed in JP 2003-6864 A, at the generally employed PRML mode, the digital equalization is performed through an FIR (Finite Impulse Response) filter member, and then Viterbi decoding is performed. The jitter value to be measured is likely to change depending on the tap coefficient and frequency characteristic of the FIR filter. Patent Application Publication No. 2003-6864 does not disclose the tap coefficient and frequency characteristic of the FIR filter in the explanation with respect to the trial writing. With the device other than the one according to the present invention, the trial writing at the mode where the write condition is selected in accordance with the target signal of the PRML does not always keep the jitter in good condition. In other words, the generally employed PRML mode has insufficiency with respect to the readout compatibility.

The trial writing technique effective for the new drive unit is required to be structured to prevent deterioration in the system performance of the readout system including the PRML mode as well as to solve the aforementioned problem.

The problem of the trial writing on the write type optical disk device at the PRML mode has been described.

It is therefore an object of the invention to provide an improved trial writing process with respect to the write type optical disk device that employs the PRML mode to cope with the write and read at higher speeds. The present invention is expected to solve the following problems by:
(1) making the write pulse condition adjustable with high accuracy to cope with the decrease in the S/N ratio caused by the write and read at higher speeds; and
(2) preventing deterioration in the performance of readout system.

The description on the solution with respect to the aforementioned problem (1) will be explained hereinafter.

The mark edges are extracted from the digitized read signals and the average level of the edge portions is evaluated to solve the aforementioned problem in the generally employed trial writing. This may improve the detection accuracy at the position where the edge shift is around zero, and evaluate quality of the write data when the asymmetry is not zero irrespective of the target signal of PRML in consideration with the readout compatibility. If the average value of the edge shift is zero, the average level of the edge portion becomes zero. The write condition is adjusted to make the level minimum such that the required trial writing with the minimum edge shift may be performed. The level of edge portion herein represents the difference between the level of the edge portion in the data stream and the determination level of the mark/space. The aforementioned level corresponds with the slice level at the direct slice mode, and the level of the target signal of the edge ("0011", "1100", etc.) at the PLML. The aforementioned values do not have to be set to zero as the internal expression of the readout circuit. However, the description will be made on the assumption that the determination level with respect to the mark/space is set to zero for the purpose of simplifying the explanation. That is, if the edge shift is set to zero, the average level of the edge portions is expected to become zero.

The restrictive condition of the aforementioned problem (2) will be described prior to the detailed description of the solution provided by the present invention.

In the readout circuit that includes the PRML and PLL, it is naturally expected that the PLL is of digital type. The PLL circuit of digital type is required at least to determine the edge and to calculate the edge level for the purpose of detecting the edge phase. The delay in the control loop tends to be greater compared with the PLL of analog type in principle. As a result, the phase margin of the PLL control loop is reduced, which tends to deteriorate the stability and suppressing performance. FIG. 3 shows examples of the phase detecting unit of the PLL of digital type. Referring to FIG. 3, in Case 1, mark edge points accord with the sample clock timing of the A/D converter. The edge shift amount is obtained by compensating the average level of two adjacent points around the edge with the edge slope. In Case 2, the mark edge points are half-clock shifted with respect to the sample clock timing of the A/D converter. The edge shift amount is obtained by compensating the level at the edge point with edge slopes of three points therearound. Referring to the drawing, in Case 1, data with respect to three time points, that is, i−1, i, and i+1 have to be referred to determine the edge, resulting in the delay equivalent to 3 clocks. Meanwhile in Case 2, data with respect to two time points, that is, i−1 and i may be referred, resulting in the delay equivalent to 2 clocks. In the case where parallel processing is performed to cope with the higher processing speed, the delay resulting from the parallel processing is further added, thus increasing the difference. In consideration with the stability of the digital PLL, it is preferable to have the A/D sample points half-clock shifted from the data edges as shown in Case 2.

A certain compensation is required to allow the A/D conversion timing to be half-clock shifted from the data edge, and the phase of the readout signal stream to be half-clock shifted so as to solve the aforementioned problem (1) while satisfying the restrictive condition as the problem (2). The essential point of the present invention is to use the FIR filter with the even numbered tap as the connection member, and to clarify the equalization condition of the FIR filter and the mode for detecting the phase and jitter.

FIG. 1 is a block diagram representing a structure of a write signal processing portion of an optical disk device to which the present invention is applied. A write signal 50 output from a not shown optical head is subjected to equalization, HPF (High Pass Filter) processing, and AGC (Automatic Gain Control) processing in an analog equalizer 11, and digitized by an A/D converter 12 so as to be converted into a write signal stream. The write signal stream is digitally equalized in an FIR filter 13, and then converted into binary data 51 in a Viterbi decoder 14. A PLL circuit 20 allows a phase comparator 21 to detect a phase error from the write data stream so as to be processed in a low pass filter 22, and then controls VCO (Voltage Controlled Oscillator) 23 to generate a clock signal 52 synchronized with a write signal. The phase detector 21 calculates the edge shift based on the levels of two points that interpose the edge to detect the phase error using the mode shown in Case 2 of FIG. 3. The clock signal 52 is supplied to the A/D converter 12 to execute a timing control of the sample as well as being used as the operation clock of the respective circuits shown in the drawing. The low pass filter 22 serves to divide the phase error information into phase data and frequency data, each of which is multiplied by an appropriate gain for the purpose of normally operating the control loop. Additionally an integrator is required to be installed within the frequency data. The structure of the digital PLL circuit is well known to those in the skilled art, and the explanation thereof, thus, will be omitted.

A jitter detection circuit 30 as the point of the present invention includes an FIR filter 31 with an even numbered tap, a phase detector 32, a pseudo-binarizer 33, and memory tables 34, 35, 36 each accumulating the detection results so as to be stored therein, respectively. The pseudo-binarizer 33 serves to binarize the write signal stream at the pseudo direct slice mode, which can be easily realized by extracting the sign bit or the MSB (Most Significant Bit) from the read signal stream. The binarized results of the pseudo-binarizer 33 is sorted by patterns in accordance with the mark length and the length of previous and subsequent spaces, which will be added and stored in the pattern table 34. The phase detector 32 calculates the edge shift amount based on the level of the edge points at the mode shown in Case 1 of FIG. 3. The accumulated value of the edge shift amounts is calculated to be stored in the shift table 36 by the respective patterns. The accumulated value of the absolute value of the edge shift amount is calculated to be stored in the jitter table 35. The jitter value may be defined as the RMS value of the edge shift. However, it is difficult to perform the real time calculation such as the square or square root in the circuit in view of the processing speed. Accordingly the accumulated value of the absolute value may be employed alternate to the RMS value for evaluating the jitter. During the trial writing, the write condition is adjusted so as to make the edge shift or the jitter minimum. If the minimum condition is kept unchanged, it may be sufficiently used for the trial writing. Two evaluated values, that is, the accumulated value of the edge shift amount and the accumulated value of the absolute value of the edge shift amount correspond with the measurement value of the edge shift and the jitter by the external TIA (Time Interval Analyzer). The condition in which the aforementioned values become zero matches arithmetically.

Assuming that the determination level with respect to the mark and space is set to zero, the pulse condition of the laser pulse is determined such that an accumulating unit that accumulates at least one of the edge point data value and the absolute value thereof (absolute value of edge shift amount) for a predetermined period is used to calculate at least one of the equivalent edge shift value and the equivalent jitter value, and to minimize one of those values, or to make one of them smaller than a predetermined value (arbitrarily determined threshold value).

The process for reducing the circuit size and the delay in the PLL control loop will be described hereinafter. The phase detectors 21 and 32 in the drawing use the value obtained by dividing the edge level by the slope of the readout signal for the purpose of calculating the edge shift. The process may be simplified as described below to reduce the circuit size and the delay in the PLL control loop.

(1) Phase Detector 21

The value obtained by adding the code corresponding to the edge shift direction to the added value of the level of two points that interpose the edge is used as the edge shift (phase error) amount. The code corresponding to the edge shift direction is represented by the slope m as shown in FIG. 3, to be multiplied so as to prevent the PPL from being out of control. This may omit execution of the averaging process and slope compensation to reduce the loop delay in the PLL circuit. The difference between the obtained value and the true value of the edge shift may be compensated by the respective gains in the low pass filter 22.

(2) Phase Detector

The value obtained by adding the code corresponding to the edge shift direction to the level of the edge point is used as the phase error. The code corresponding to the edge shift direction is represented by the slope m as shown in FIG. 3. The problem does not occur when the slope is not multiplied so long as the trial writing sequence allows the average value of the edge level to be close to zero. On the generally employed DVD medium having the reflection coefficient of the write mark decreased, the shift direction of the write pulse and the resultant data edge shift direction of the written data are reversed with each other. As this may cause generation of the bug in the control software, the code has to be added whenever possible. This makes it possible to simplify the conversion calculation from the voltage level through the slope compensation to the shift in the time direction, thus reducing the circuit size. The difference with respect to the true value of the edge shift is considered to be negligible. The aforementioned function is employed for the trial writing. During the trial writing, the condition for the write pulse is adjusted such that accumulated value of the edge shift or the absolute value thereof is minimized. The difference of those values, thus, may be ignored. The relationship between the true edge shift amount and the edge point level calculated through the simple process may be preliminarily obtained. This makes it possible to obtain the edge shift amount and the jitter amount, by which the conversion coefficient is multiplied later.

The structure and setting of the tap coefficient of the FIR filter 31 within the jitter detection circuit 30 as the point of the present invention will be described in detail.

The FIR filter 31 according to the present invention functions in compensating the phase of the A/D converted readout data stream such that the edge point matches with the data point. Assuming that the readout data stream is designated as Yin[i], and the output of the FIR filter is designated as Yout[i], the following expression is obtained.

$$Y_{out}[i] = \sum_{n=1}^{N} Y_{in}[i-n] \times C[n] \tag{1}$$

In the above expression, N refers to the tap number of the FIR filter, and C[n] refers to the respective tap coefficients. The following expressions will be used to shift the phase of the input signal by 90 degrees such that the edge point matches with the data point.

$$N = \text{Even} \qquad (2)$$

$$C[N + 1 - n] = C[n], n = 1, 2, \ldots N \qquad (3)$$

$$\sum_{n=1}^{N} C[n] = 1 \qquad (4)$$

In other words, the FIR with the even numbered tap is used to select the coefficient symmetrical to the time reflection. The expression (4) is used as the restrictive condition indicating that the DC gain of the FIR filter is set to 1. In the simplest case, for example, if N=2, the relationship of C[1]=C[2]=0.5 is established. This makes it possible to obtain the edge point data as the average value from the data of two points that interpose the edge. The expressions (2) to (4) indicate the conditions for obtaining the level of the edge point from the level of the point around the edge. However, they do not assure the flatness of the frequency characteristics of the FIR filter. The influence given by the aforementioned conditions will be described below.

FIG. 4 is the view that graphically shows the influence resulting from the error when the tap number N is set to 2. When the error becomes maximum, the condition in which the inter-symbol interference becomes maximum is established. In the case where the minimum mark length of the DVD is 3T, the error becomes maximum at the leading edge of the 3T mark subsequent to the long space, for example, 11T. Referring to the drawing, in the aforementioned case, even if the edge shift of the readout signal (indicated by the solid line) is set to zero, the interpolated level derived from interpolation of two points that interpose the edge does not become zero. The resultant value represents the detection error of the edge level, which corresponds with the detection error of the edge shift.

FIG. 5 shows respective structures of four FIR filters which have been examined. FIGS. 5A, 5B, 5C, 5D represent structures of the FIR filters with 2-tap, 4-tap, modified 4-tap, and 6-tap, respectively. FIG. 6 is a table of the calculated values of tap coefficients of the aforementioned FIR filters, which satisfy the expressions (2) to (4), and have frequency characteristics as flat as possible.

FIG. 7 graphically shows the calculated relationship between the frequency values of the respective FIR filters and the gains. Referring to the graph, the frequency is normalized such that the 3T-3T frequency becomes 1 relative to the shortest run length of the DVD. Assuming that the condition of the flat frequency characteristic is established when the gain is in the range of +/−0.5 dB at the 3T-3T frequency from the direct current, the graph shows that the FIR filter with 4 or more tap numbers satisfies the condition except the FIR filter with 2 tap number. The adequacy of the condition is shown by the simulation with respect to the 2-tap FIR filter and the modified 4-tap FIR filter (that exhibits the largest deviation from the condition of flat frequency characteristic among the rest of the filters).

FIG. 8 shows the relationship between the evaluated values of the FIR filters with 2-tap and modified 4-tap and the jitter values measured by the external TIA. The results on the graph are derived from the simulation for calculating values of the readout signals of the DVD-RAM while changing the boost amount of the analog equalizer. In the case where the 2-tap FIR filter is used, the minimum condition shifts by about 1 dB in terms of the boost amount, and about 1.7% in terms of the jitter value caused by the error in the edge shift detection as described above. Meanwhile, in the case where the modified 4-tap FIR filter is used, the boost amount that minimizes the jitter amount matches with that derived from the external TIA within the calculation error allowable range. Accordingly, the adequacy of the structure of the present invention is indicated as being usable for providing the evaluated value for trial writing by performing the phase compensation with the FIR filter with 4 or more tap numbers.

The structure of the jitter detection circuit sufficient to allow the trial writing, and the phase compensation condition using the FIR filter the even tap number have been described. When the thus structured circuit is combined with the readout signal processing circuit, the trial writing in good condition is allowed. The present invention may be considered as the task to be established as disclosed in Internal Publication No. WO01/011614. Quality of the signal with the edge shift around zero may be evaluated as the edge level is directly evaluated. It is clearly understood that the output signal of the analog equalizer may be evaluated equivalently with the external TIA irrespective of the target signal of PRML with respect to evaluation of quality of signal when the asymmetry is not zero in Patent Application Publication No. 2003-6864.

The advantage of the measurement dependent on the pattern formed of the mark length and the lengths of previous and subsequent spaces will be described hereinafter.

The present invention is structured to store not only the edge shift amount but also the binalized results. This makes it possible to obtain the jitter amounts and the average shift amounts by the respective patterns depending on the mark length and the lengths of previous and subsequent spaces. Accordingly the respective elements may be processed in parallel to execute optimization in accordance with the respective write strategy of DVDs with different write pulse shape conditions depending on the mark length and the lengths of previous and subsequent spaces. The time required for the process, thus, may be reduced. The outline is substantially the same as the one disclosed in the International Publication No. WO01/011614. The CPU that is not shown in FIG. 1 commands the write data processing portion that is not shown to change the write pulse shape and power conditions, and to evaluate quality of the readout signal corresponding to the conditions. Based on the results, the appropriate write pulse shape and power conditions may be determined so as to realize the invention.

It is clearly understood that the invention is capable of solving the problem (1) while satisfying the restrictive condition (2). This makes it possible to realize the optimization of the write pulse and power conditions within a short period of time with the simplified structure, thus providing the optical disk device that assures the readout conversion with the drive unit.

The use of the write process and the optical disk device according to the present invention allows the trial writing to optimize the write pulse conditions (write strategy) in the optical disk device of write type in consideration with the high-speed processing and the readout conversion with the other drive unit. The resultant effects will be described below.
(1) The linear evaluation with the edge shift around zero may be evaluated, and the accuracy in the trial writing may be improved to cope with the decrease in the S/N ratio accompanied with the high-speed processing.

(2) The trial writing based on the jitter value is allowed irrespective of the class or structure of the PRML so as to assure conversion with the other drive unit.

BRIEF DESCRIPTION OF THE DRAWINGS

FIG. 6 is a table showing calculated values of the tap coefficients that satisfy the condition for jitter detection with respect to the FIR filters;

FIG. 10 graphically shows write strategies of various media including DVD-R, DVD-RW, and DVD-RAM;

DETAILED DESCRIPTION OF THE PREFERRED EMBODIMENTS

The present invention will be described in detail referring to the embodiments.

First Embodiment

Figure 1:
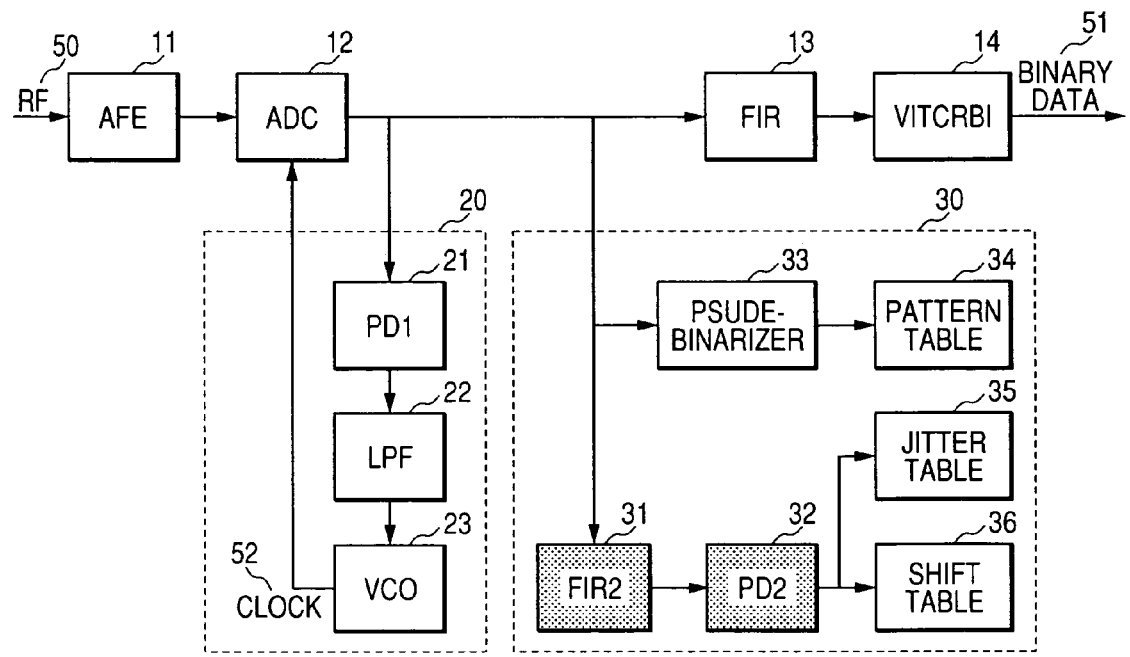
FIG. 1 is a block diagram showing a structure of a readout signal processing portion in an optical disk device according to the present invention.
Figure 2:
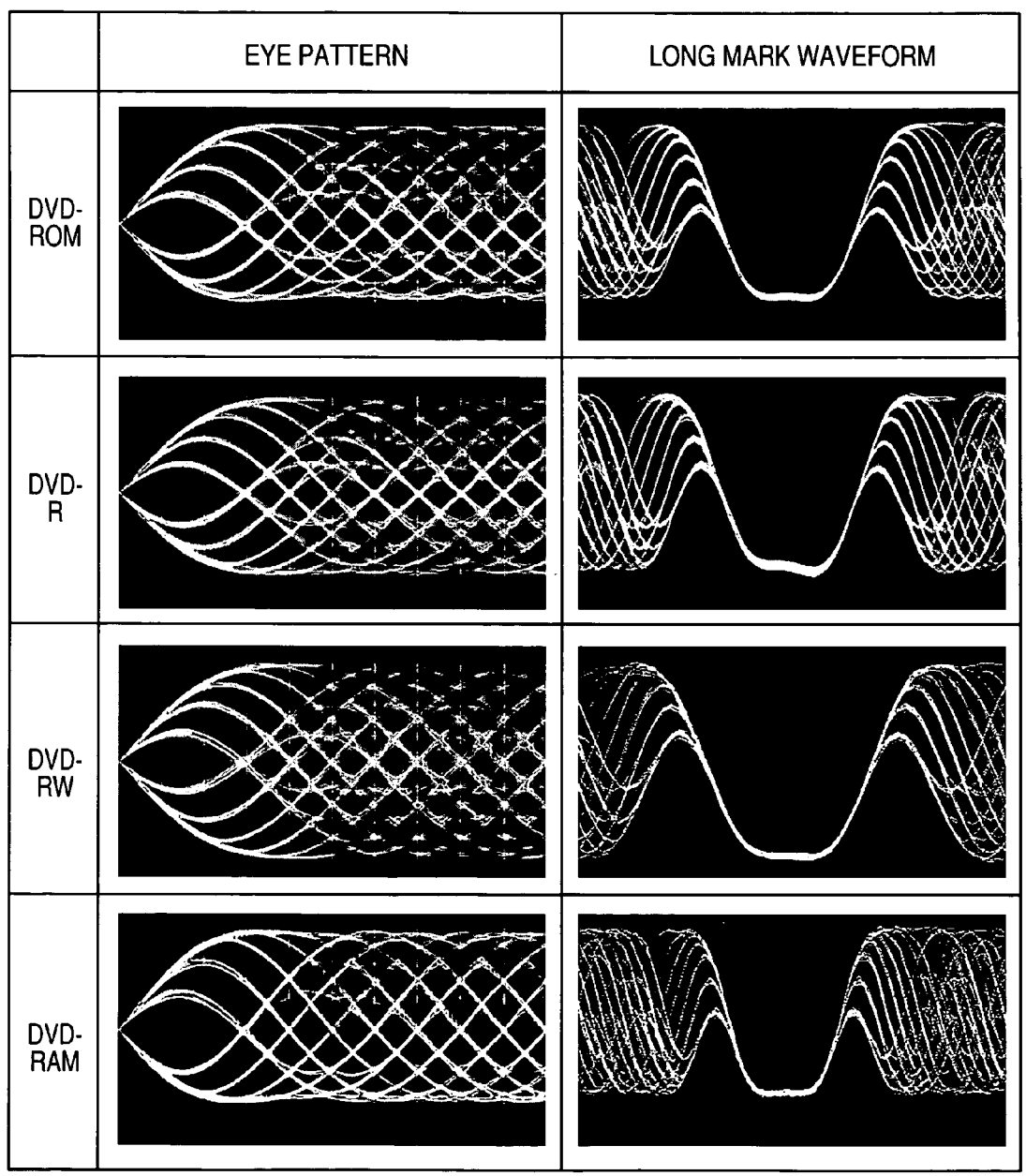
FIG. 2 graphically shows readout signals written on commercial DVD media under a minimum jitter condition.
Figure 3:
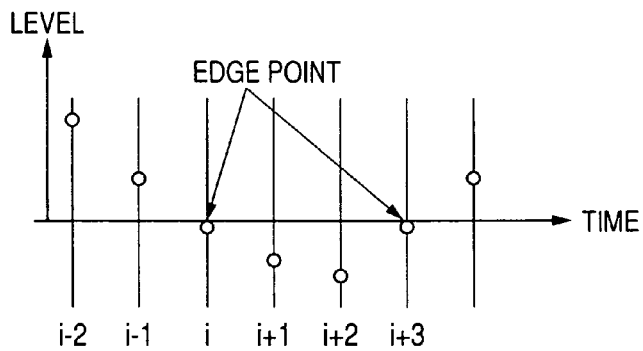
FIG. 3 graphically shows exemplary fundamentals of a phase detector of a digital PLL.
Figure 3:
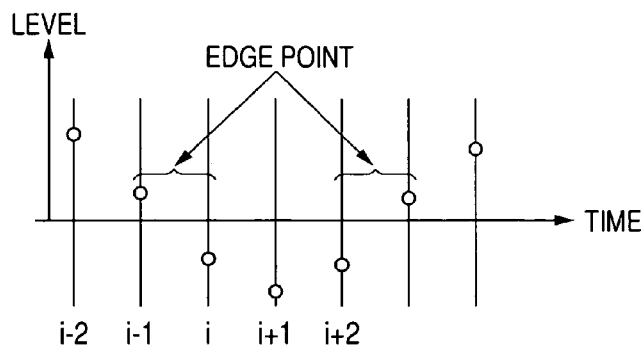
Figure 4:
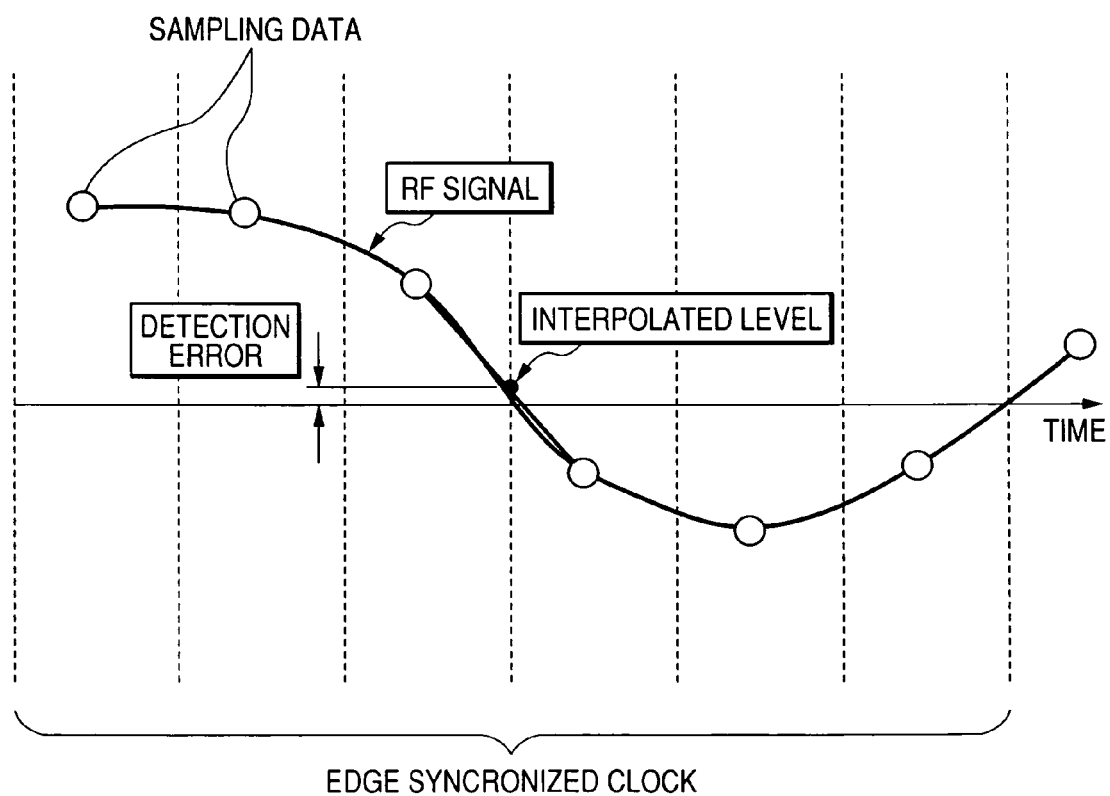
FIG. 4 graphically shows an influence of an error in edge shift detection under the condition where the tap number N is equal to 2.
Figure 5A:
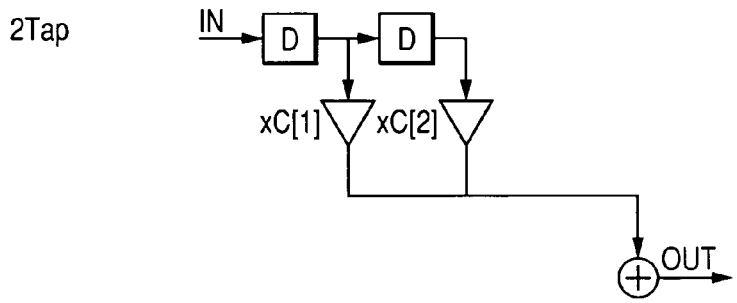
FIG. 5 shows structures of four types of FIR filters which have been examined.
Figure 5B:
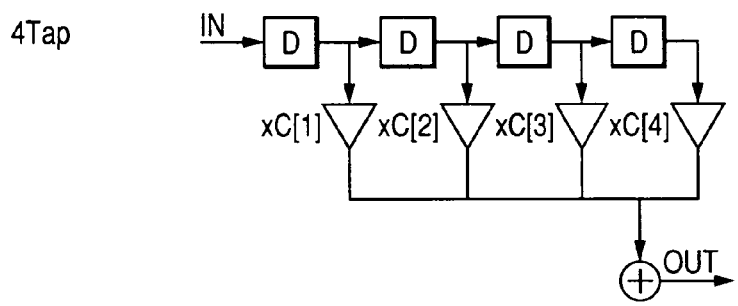
Figure 5C:
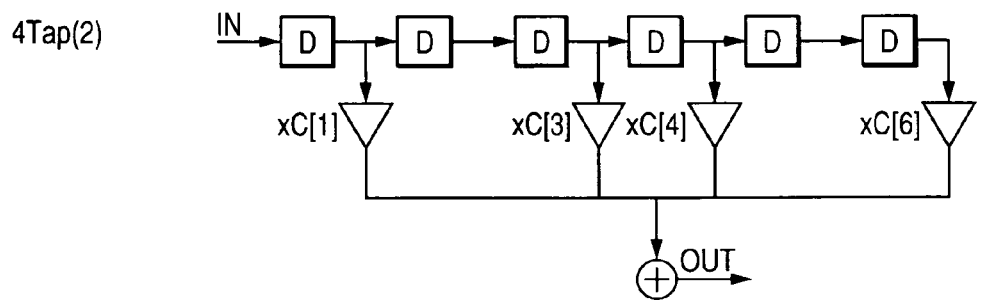
Figure 5D:
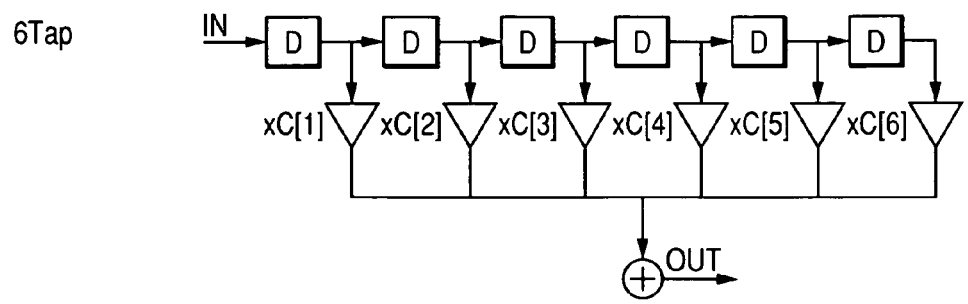
Figure 7:
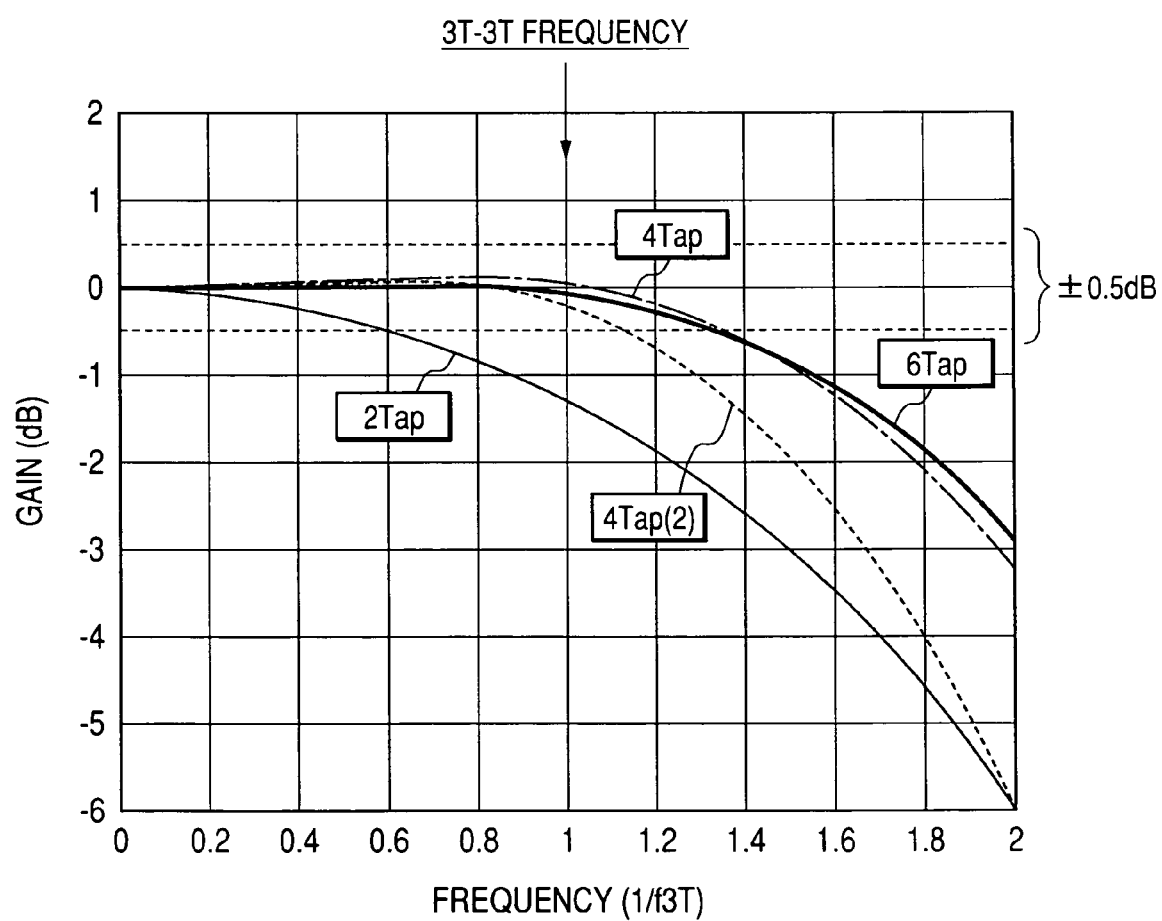
FIG. 7 is a graph showing calculation results of the relationship between frequency and gain of the respective FIR filters.
Figure 8:
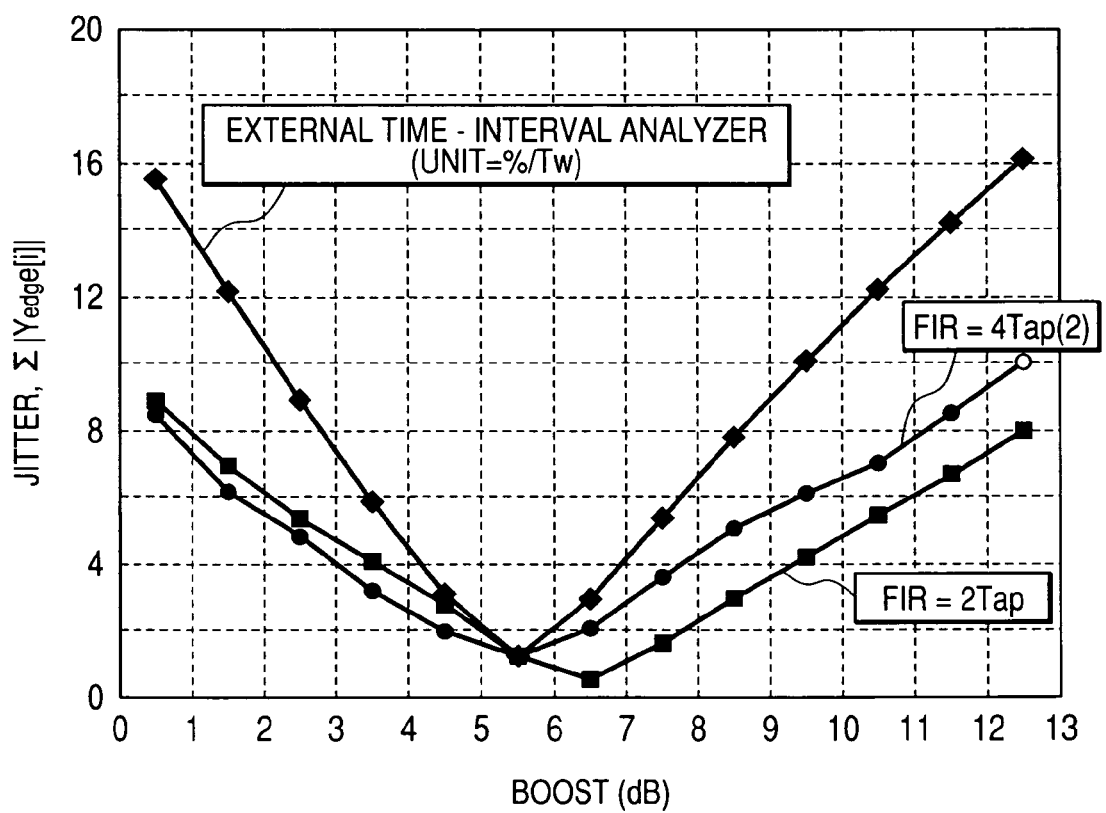
FIG. 8 is a graph showing the relationship between the evaluated values obtained in the cases where the FIR filter with 2-tap and modified 4-tap are used, and the jitter values detected by the external TIA.
Figure 9:
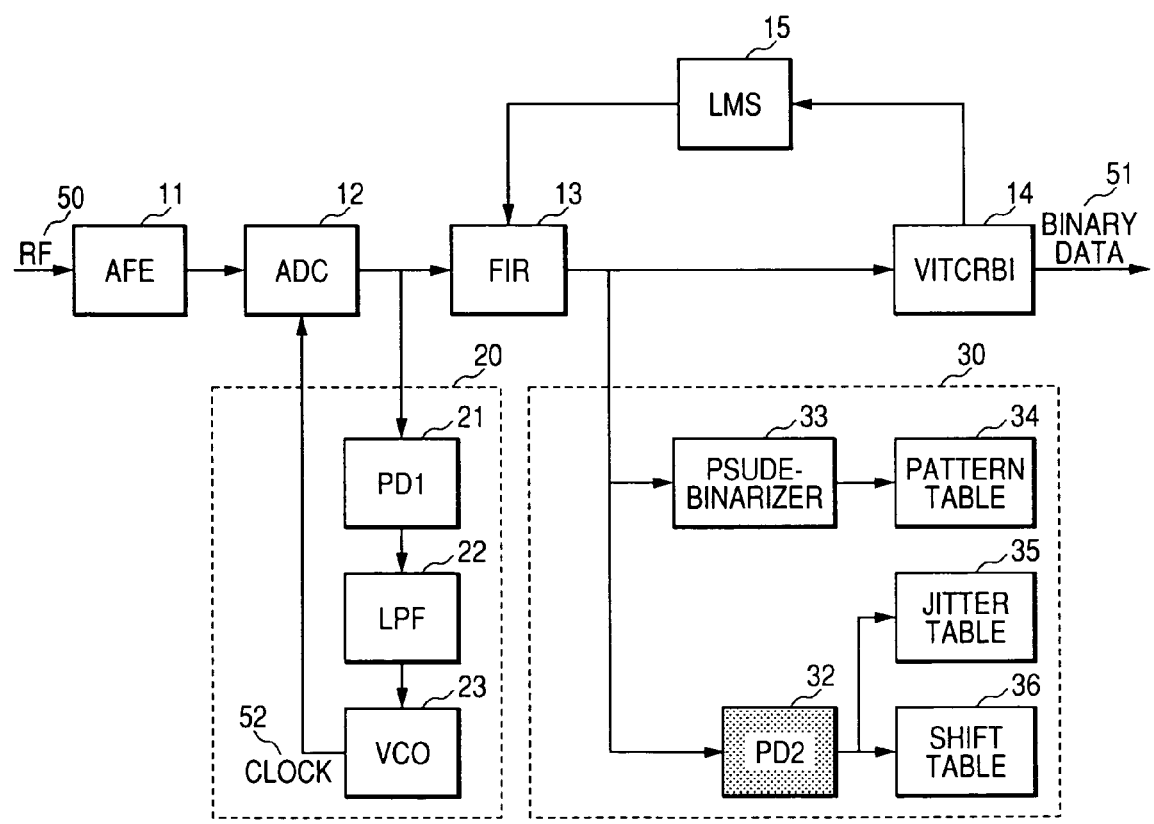
FIG. 9 shows a structure of a readout signal processing circuit preferable for the optical disk device according to the present invention.

Block Structure
FIG. 9 shows a structure of a readout signal processing circuit for an optical disk device according to the present invention. The difference between the structure shown in FIG. 1 and the structure shown in FIG. 9 will be explained hereinafter.
(1) Shared FIR Filter
The circuit structure shown in FIG. 1 is provided with two FIR filters, that is, the FIR filter 13 for the Viterbi decoder 14, and the FIR filter 31 within the jitter detector circuit 30. It is well known that if the constraint length (class bit number) of the Viterbi decoder is even numbered, the tap number of the FIR filter 13 becomes even. As the trial writing is not performed simultaneously with the normal write/read operation, the tap coefficient of the FIR filter 13 may be changed to function as the FIR filter 31. It is preferable to change the tap coefficient of the FIR filter 13 to widen the variable range of the boost amount. Assuming that the tap number is set to 4, it is preferable to take the structure shown in FIG. 5C capable of calculating the readout signal from the time far off rather than the use of the structure shown in FIG. 5B. FIG. 5C is shown on the assumption that the FIR filter is expected to perform a plurality of functions.
(2) Automatic Equalizing Function
An automatic equalizing function control unit 15 is shown in the drawing. It is effective to adaptively change the tap coefficient in accordance with the readout signal in view of suppressing the group delay influence owing to the high speed processing. The specific example will be described later. The LMS (Least Mean Square) process has been well known as the automatic equalizing algorithm, which may be applied to the present invention. In the LMS process, the target signal and the readout signal of the Viterbi decoder are compared with each other. The resultant difference is multiplied by the coefficient to update the value of the tap coefficient sequentially.

Second Embodiment

Figure 11:
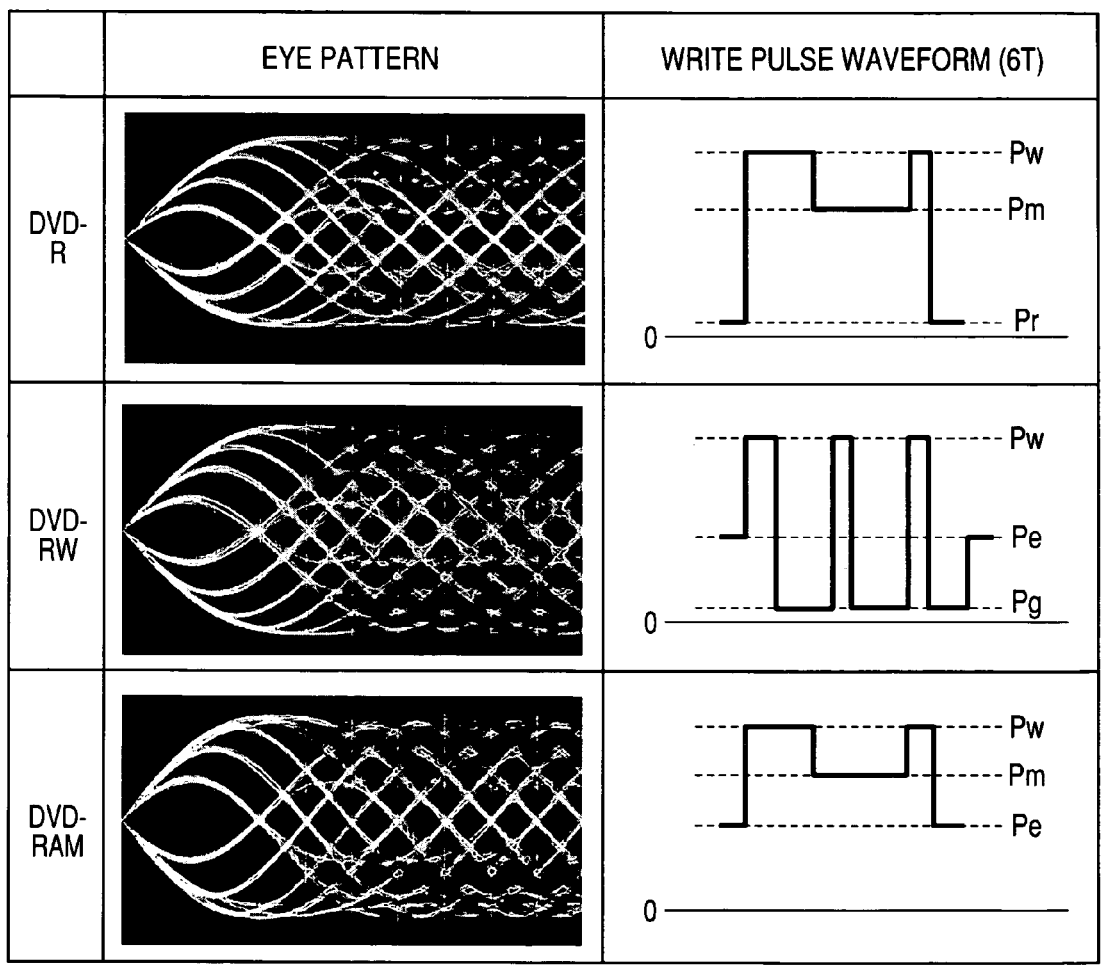
FIG. 11 graphically shows write strategies of various media including DVD-R, DVD-RW, and DVD-RAM.

Trial Writing Sequence
The write strategies for the respective DVD media will be described prior to the explanation of the embodiment of the trial writing sequence according to the present invention.
FIGS. 10 and 11 graphically show the write strategies for the respective media of DVD-R, DVD-RW, and DVD-RAM. FIG. 10 shows the normal speed write condition, and FIG. 11 shows the high-speed write condition, respectively. The write strategy suitable in accordance with the write physics of the respective media is employed. The write physics inherent to each medium will not be described in detail as it is beyond the essential points of the present invention. However, it should be known to optimize the write strategy.

Besides the jitter detection realized in the present invention, asymmetry value, value β, and modulation degree will be measured in the following sequence. Each of those values is well known as the evaluation index. They may be easily obtained through calculation by digitizing the readout signal in the circuit shown in FIG. 1. The explanation about the respective observation processes, thus, will be omitted.

Figure 12:
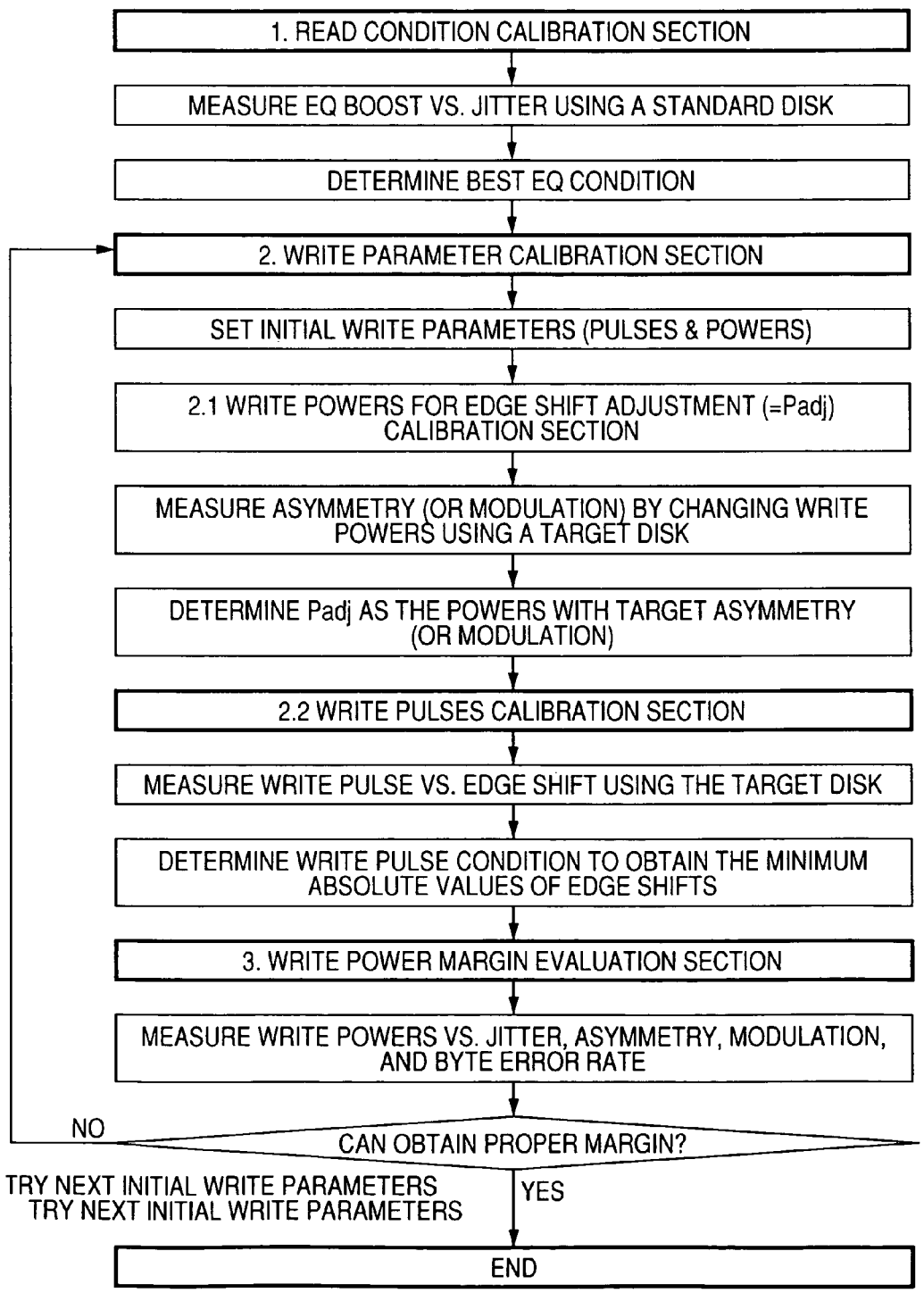
FIG. 12 is a chart showing a sequence for optimizing the write strategy according to an embodiment of the present invention.

FIG. 12 shows an optimizing sequence of the write strategy as the embodiment of the present invention. The aforementioned sequence includes step (1) for read condition calibration, step (2) for write parameter calibration, and step (3) for write power margin evaluation. The step (2) for write parameter calibration further includes step (2.1) for write powers for edge shift adjustment calibration and step (2.2) for write pulses calibration. The respective steps will be described hereinafter.

(1) Read Condition Calibration

The write type DVD media include DVD-RAM, DVD-R, DVD-RW, DVD+R, and DVD+RW. A single drive unit is required to write and read the information conforming to the respective disks. The numeric aperture NA of the head for the reference drive, which is defined in the specification is different depending on the type of the media. For example, each of the DVD-RAM, DVD-R and DVD-RW has the NA set to 0.60, and each of the DVD+R and DVD+RW has the NA set to 0.65. Accordingly the NA is required to be selected between the aforementioned values in order to allow the single optical head installed in the drive unit to cope with all the disks. Generally, the larger value of the NA, that is, 0.65 may be selected to write and read the information at smaller spot size from the aspect of the signal quality or the write power efficiency upon high speed writing as natural consequence. In the case where write conditions of the DVD-RAM, DVD-R, and DVD-RW are optimized, the write pulse conditions are required to be optimized so as to improve the jitter value read by the optical disk device with the NA of 0.60. For example, if the readout is performed with the DVD-R by the device with the NA set to 0.60, the boost amount for the waveform equalization is set to 3.2 dB. When the write conditions are optimized at the same boost amount of 3.2 dB for the waveform equalization with the device with the NA set to 0.65, the jitter value measured upon readout with the written disk by the apparatus with the NA value normally set to 0.60 is deteriorated owing to different optical spot size. Then calibration of the EQ boost amount is required for the purpose of coping with the optical head with different NA. More specifically, the standard disk is subjected to readout so as to determine the EQ boost amount which makes the jitter value minimum. The EQ boost condition will be used in the following step.

(2) Write Parameter Calibration
(2.1) Write Powers for Edge Shift Adjustment Calibration The DVD-RAM contains control data written thereon, while the respective disks contain write conditions recommended by the media manufacturers. The recommended write pulse shape (pulse width and edge position) is used as it is such that power calibration is performed for absorbing the difference in the spot form owing to the different NA, and the error in the power calibration for the drive unit. The DVD-RAM and the DVD-R are commanded to use the asymmetry value and the value β (equivalent to the asymmetry), respectively, based on which the write power value (erasure power value, bottom power value) is determined to establish the target asymmetry (target value β). In next step, the write power value obtained in this step will be used.

(2.2) Write Pulses Calibration

The jitter detection circuit of the present invention is used to evaluate the edge shift amount TSFP (Tsp, Tmk) and TELP (Tsp, Tmk) of the leading and trailing edges of the mark while changing the shape parameter of the write pulse, that is, the control parameter of the leading and trailing edges. The shape parameter of the corresponding write pulse is calibrated such that the edge shift amount reaches zero. The TSFP (Tsp, Tmk) represents the edge shift of the leading edge of the mark having the previous space length of Tsp and the mark length of Tmk. The TELP (Tsp, Tmk) represents the edge shift of the readout signal of the trailing edge of the mark having the mark length of Tmk and the subsequent space length of Tsp. The values of the parameters TSFP (6T, 6T) and TELP (6T, 6T) for the write pulse shape having the long mark with 6T or longer are set to be constant.

In the present invention, the description of the write pulse of 4×4 table type employed for the DVD-RAM will be normally used hereinafter. In order to emphasize the one-on-one correspondence between the edge shift amount of the readout signal and the edge compensation amount for the write pulse, they will be designated with the same codes unless the essential point becomes complicated.

(3) Write Power Margin Evaluation

The power margin is obtained by evaluating all the jitter values and ECC error rates, if any, with the calibrated write pulse shape parameters while changing the write power (alternatively, erasure power value or bottom power value). If the sufficient power margin is obtained, the loop is terminated. If the sufficient power margin is not obtained, the initial values of the TSFP (6T, 6T) and TELP (6T, 6T) for the shape parameters of the write pulse are changed to execute the process repeatedly.

Figure 13:
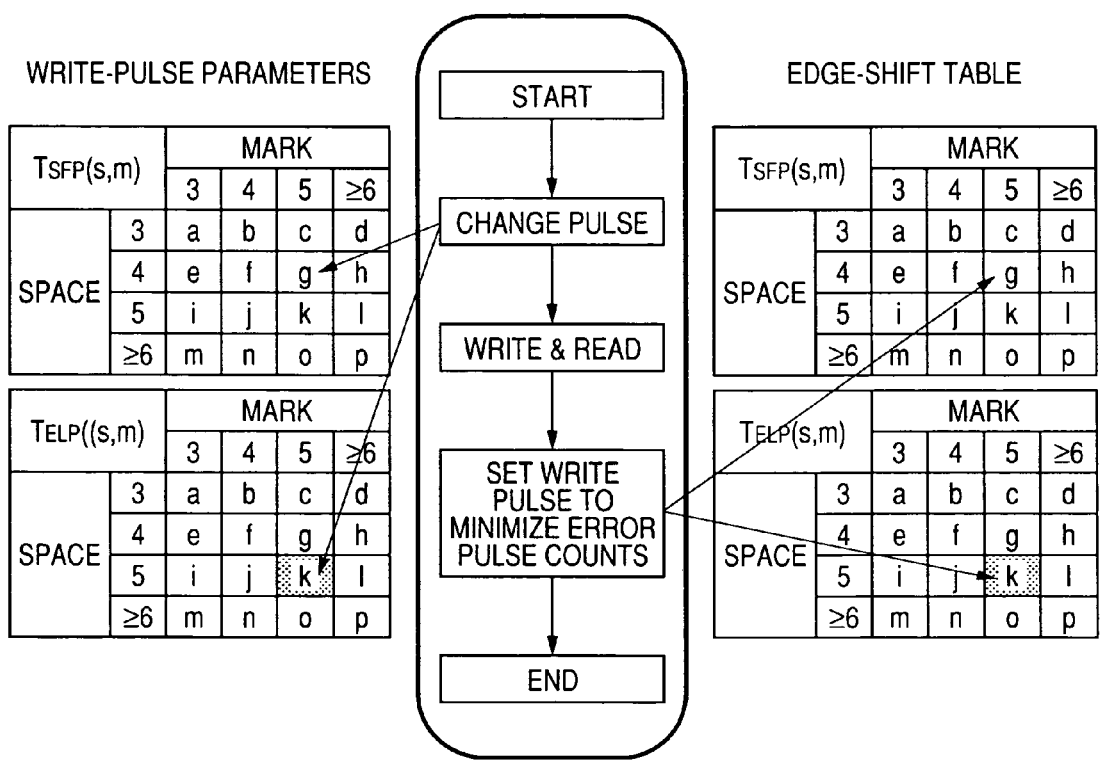
FIG. 13 graphically shows the flow of step for calibrating the write pulse shape taking the DVD-RAM as the example.

FIG. 13 graphically shows the flow of write pulse shape calibration step with the DVD-RAM. On the DVD-RAM, the write pulse parameters are defined in 4×4 tables for the previous and subsequent edges, respectively. The shift table 36 shown in FIG. 1 employs the edge patterns in the same 4×4 table where the accumulated value of the respective edge levels are measured and contained. In the simple sequence, the shape parameters for the write pulse are changed so as to be written on the optical disk medium. The aforementioned sector is read to evaluate the corresponding edge shift value. Then the shape parameters for the write pulse are determined to make the evaluated value minimum. As the example clearly shows, the shape parameter for the write pulse and the edge shift table as the evaluated value are corresponded one on one. By changing parameters of a plurality of write pulses to perform write and read on a single trial operation, the shape parameters for the plurality of write pulses may be simultaneously optimized in parallel. This makes it possible to reduce the processing time.

Figure 14A:
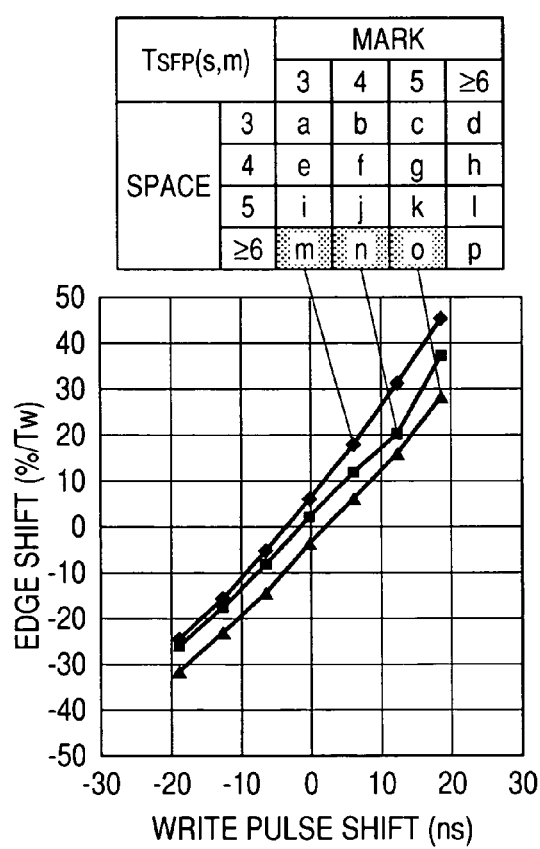
FIG. 14 shows exemplary measurement results for determining the write pulse shape parameters of 2×DVD-RAM medium.
Figure 14B:
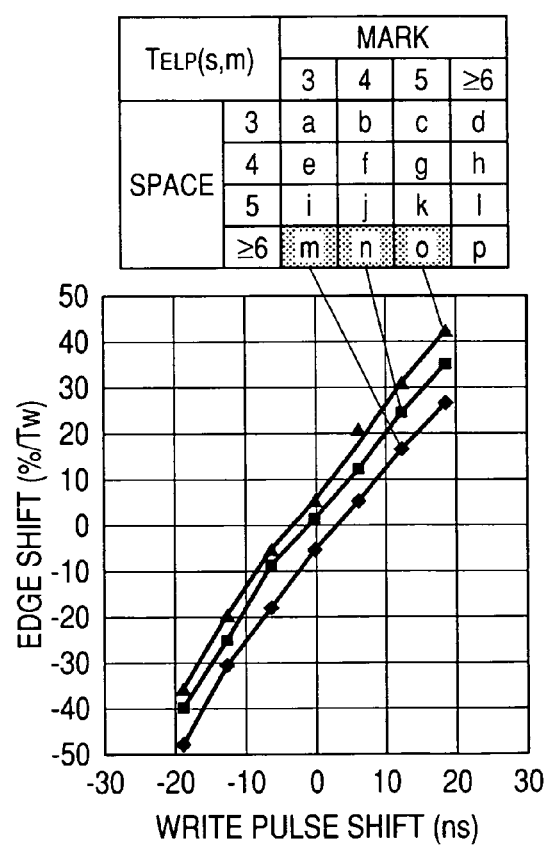

FIG. 14 shows the measurement results for determining the shape parameters of the write pulse of the commercial 2× DVD-RAM medium. In the drawing, measurement values of the edge shift with respect to the deviation from the appropriate values for six patterns each having the 6T space. The shape parameter of the write pulse is selected to allow the edge shift value to reach zero for the purpose of optimization.

Figure 15:
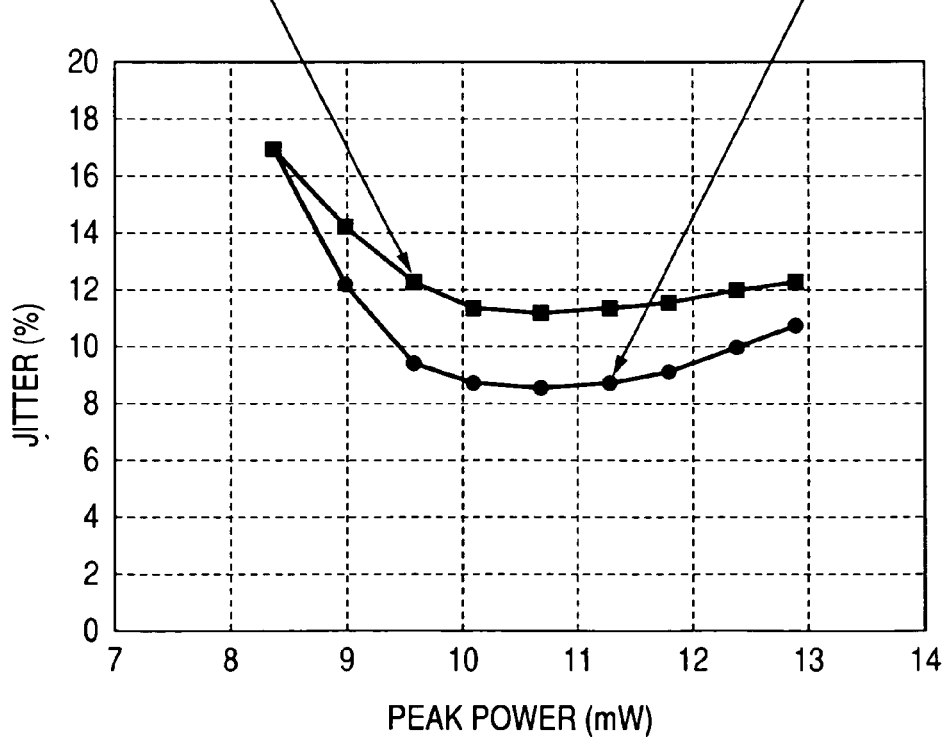
FIG. 15 shows measurement results that represent the difference in the write power margin between before and after the optimization of the write pulse shape.

FIG. 15 graphically shows the difference in the write power margin between before and after optimization of the write pulse shape. The shape parameters of the write pulse in the 4×4 table are determined, and the relationship between the write power and the jitter value is measured. Referring to the drawing, the jitter value is improved with the process according to the present invention to obtain excellent write power margin.

Figure 16A:
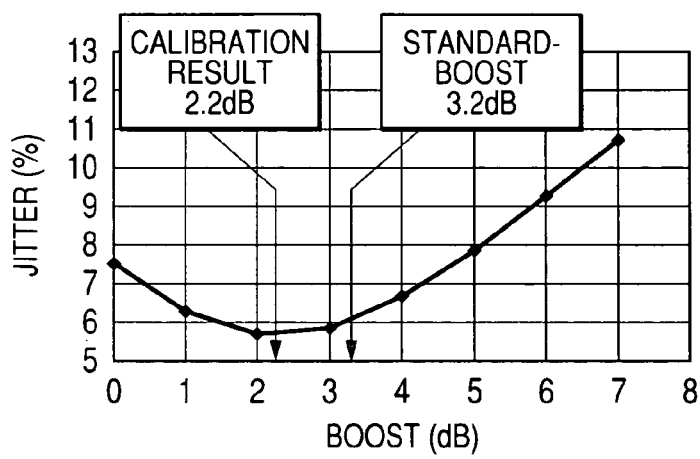
FIG. 16 shows examples of the sequence for calibrating the write pulse shape and power with respect to 2× writing on the DVD-R medium.

FIG. 16 represents an exemplary calibration sequence for the write pulse shape and power with respect to the 2× writing on the commercial DVD-R medium. Referring to FIG. 16A, in step (1) for read condition calibration, the relationship between the equalizing boost amount and the jitter value is obtained using the standard disk, based on which the equalizing boost amount is set to 2.2 dB.

Figure 16B:
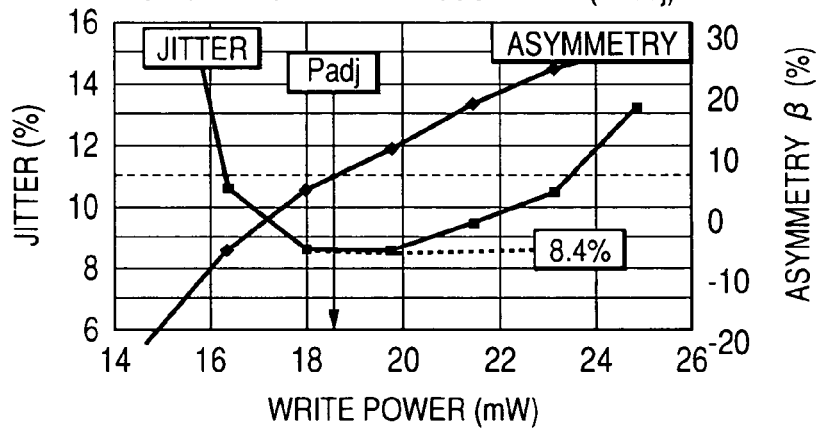

FIG. 16B represents step (2.1) for write powers for edge shift adjustment calibration. The value β and the jitter value are measured in the state where the write pulse shape is kept, and the write power is changed while taking the parameter for recommended write strategy read from the land pre-pit as the initial value, resulting in the write power Padj that allows the value β to be set to 5%.

Figure 16C:
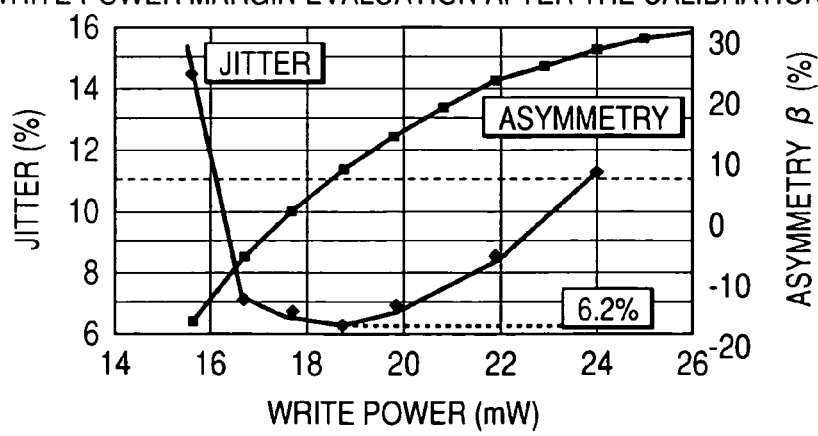

FIG. 16C represents the result of the relationship between the write power and the jitter value re-measured after the calibration of the shape parameters of the write pulse. Referring to the drawing, the shape parameters of the write pulse are optimized through the trial writing process according to the present invention, and accordingly the jitter value is improved from 8.4% to 6.2%.

Figure 17:
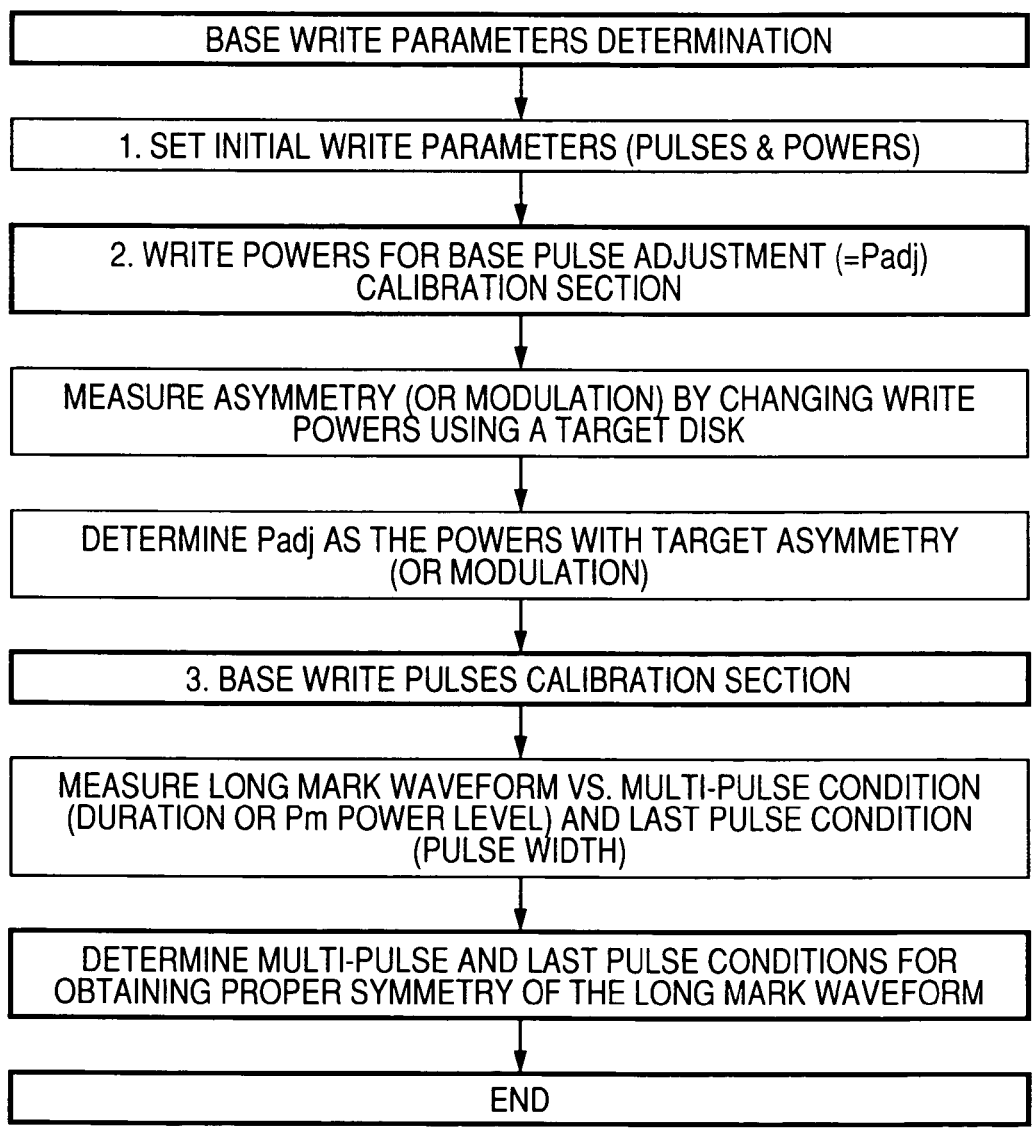
FIG. 17 is a chart showing a sequence for optimizing the pulse shape parameters so as to write the long mark.

FIG. 17 represents an exemplary sequence of optimizing the pulse shape parameters for writing the long mark. For example, when sufficient power margin cannot be obtained in the sequence shown in FIG. 12, the present sequence is executed to change the initial value of the write pulse shape parameter TSFP (6T,6T) to TELP (6T,6T). The sequence includes step (1) for setting initial write parameters, step (2) for write powers for base pulse adjustment, and step (3) for base write pulses calibration. Hereinafter, the TSFP (6T,6T) and TELP (6T,6T) as the pulse conditions for writing the long mark equal to or longer than 6T will be referred to as the basic parameters for write pulse shape. The respective steps will be described in detail.

(1) Set Initial Write Parameters of Write Pulse Shape and Power

The write pulse shape and power read from the control data or the land pre-pit as recommended by the media manufacturers are set as the initial values.

(2) Write Powers for Base Pulse Adjustment Calibration

With the same process as step (2.2) for write pulses calibration shown in FIG. 12, the write power for adjustment is obtained.

(3) Base Write Pulses Calibration

The waveform of the long mark is extracted to measure its flatness, and calibration of the write pulse shape is made such that the asymmetry in the previous and subsequent thereof is brought into the allowable range. Specifically, the jitter value of the long mark, and the asymmetry or value β are measured while changing the intermediate power level (Pm) shown in FIG. 11. The base parameter of the write pulse shape is determined such that the aforementioned values are brought into the allowable range.

Figure 18:
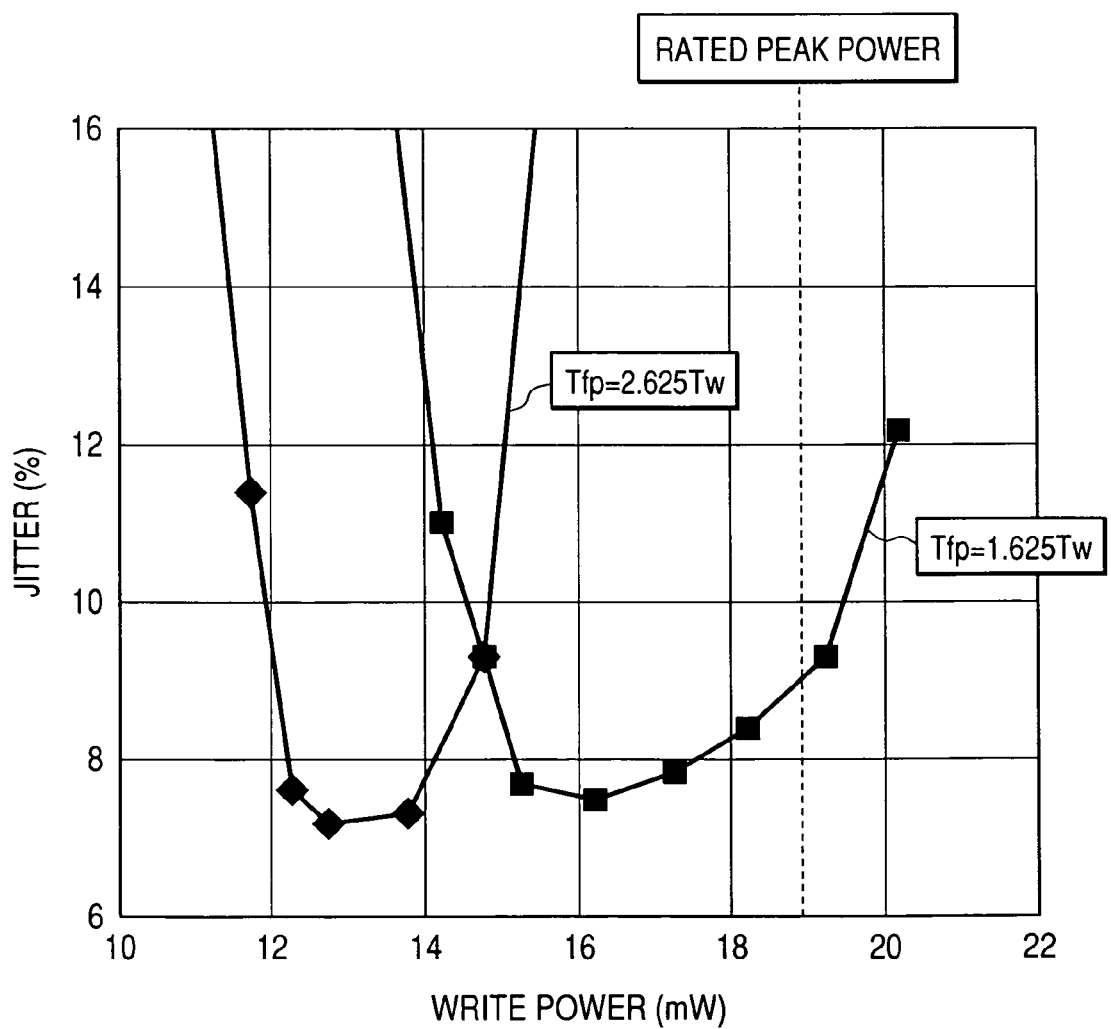
FIG. 18 shows measurement results of the change in the write sensitivity of the DVD-R with respect to the basic parameters about the write pulse shape.

FIG. 18 represents the change in the write response to the basic parameters of the write pulse shape, which has been measured on the DVD-R. The write power margin is the essential index for determining reliability of the drive unit. There may be the case where the rated value of simultaneously irradiated laser power is not large sufficient to the response of the write medium. The aforementioned problem is likely to occur in the course of development of high performance drive unit at the cost as minimum as possible. In such a case, it is effective to change the write pulse shape so as to perform writing at the rated write power or less. The drawing shows the example for writing at 2× speed on the commercial DVD-R medium. If the writing is performed with the pulse recommended by the medium manufacturer (leading pulse width: 1.625T), the margin is reduced relative to the rated power 18.5 mW. Meanwhile, if the leading pulse width is increased to 2.625T, and the write pulse enlarged by linking the duty of the multi-pulse is used to make the long mark shape as flat as possible, the similar jitter value may be obtained even at the low write power by approximately 20%. This makes it possible to obtain the margin sufficient to the rated output. In the aforementioned case, it is effective to change the basic parameters for the write pulse shape.

Figure 19:
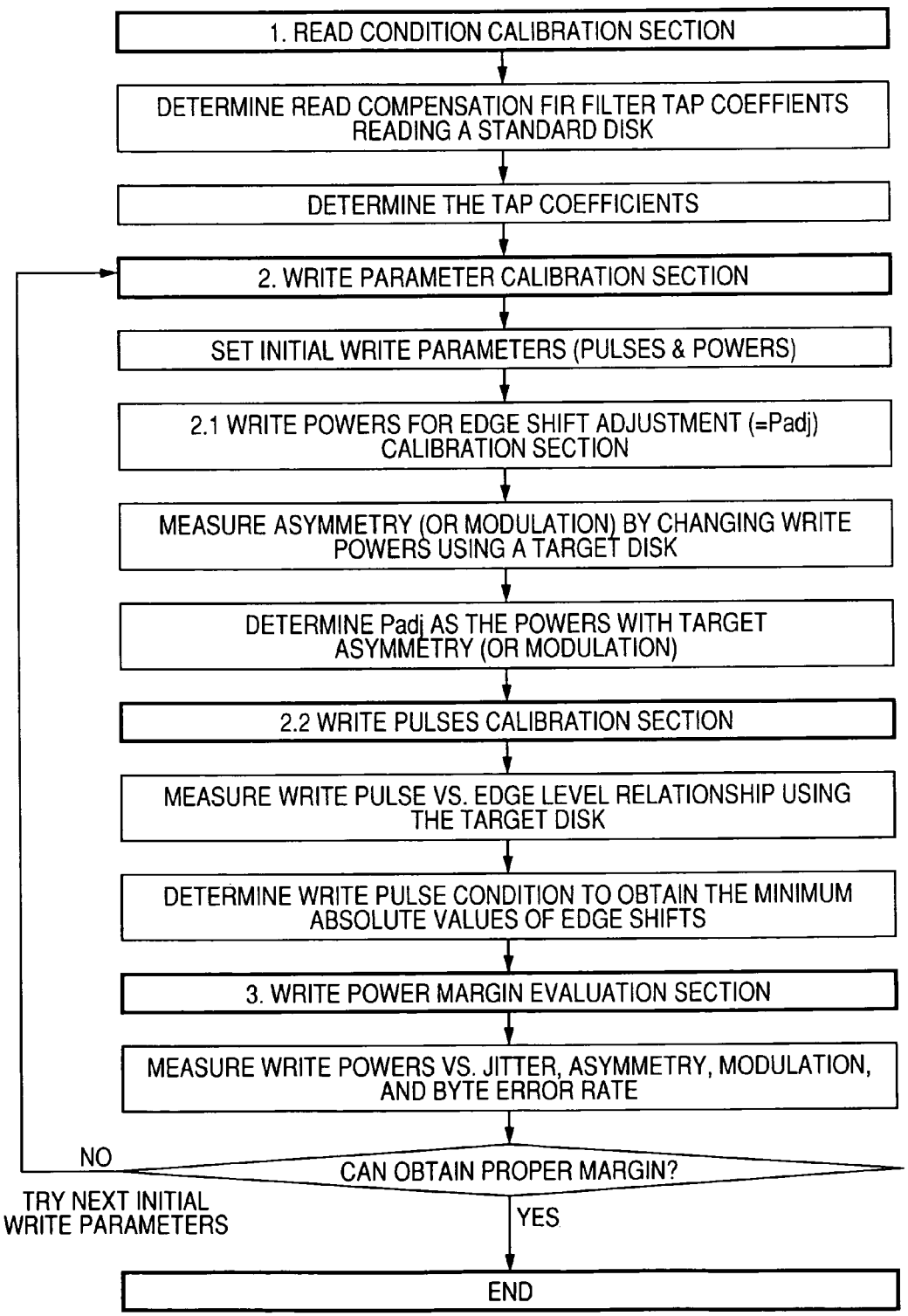
FIG. 19 is a chart of another embodiment for showing a sequence for optimizing the write strategy according to the present invention.

FIG. 19 shows another exemplary optimizing sequence for the write strategy according to the present invention. Compensation is made with the FIR filter to cope with the increase in the effect of the group delay caused by the high speed processing in addition to the difference in NA. In the present embodiment, the FIR filter which exhibits the automatic equalizing function as shown in FIG. 9 is required to be employed. The sequence includes step (1) for read condition calibration, step (2) for write parameter calibration, and step (3) for write power margin evaluation. The present sequence is different from that shown in FIG. 12 in step (1) for read condition calibration which is realized by performing automatic equalization while reading standard data at the aforementioned speed. It is to be noted that the tap coefficient is kept unchanged during the trial writing.

The qualitative relationship between the frequency characteristic of the I-V amplifier and noise will be described. The I-V amplifier is considered to be a main cause of the increase in the group delay or fluctuation in the gain owing to the high speed processing. The band of the I-V amplifier is defined under the condition where the gain is reduced to 3 dB. If readout is performed at the 16× speed on the DVD-RAM, the frequency of the repetitive signal with the minimum run length (3T) becomes about 80 MHz. The I-V amplifier having the band that is at least twice the band of 80 MHz is required to read such signal appropriately. The performance of the I-V amplifier varies with the optical detector, the conversion resistance value, and the IC process. Generally, likewise the performance index of the transistor or the operational amplifier, there may be a restrictive condition that the product of the band and the gain (that may be considered as the inverse number of noise) should be kept constant. The use of the I-V amplifier with wider band, thus, causes the increase in noise. The I-V amplifier for the head employed in the optical disk device is designed and selected under the aforementioned restrictive condition so as to maximize the performance. In the case where the readout band is widened to 160 MHz, the noise is increased accordingly. Therefore, the band limited to approximately 120 MHz is required to obtain the desired performance of the device. The band of the frequency of the device subjected to the experiment was set to 110 MHz. It is considered to prevent the above-described characteristic from causing the error upon normal data readout. However, it is not preferable to use the I-V amplifier that functions to assure the readout compatibility for optimizing the write pulse shape and power from the aspect of the increase both in noise and manufacturing costs.

Figure 20:
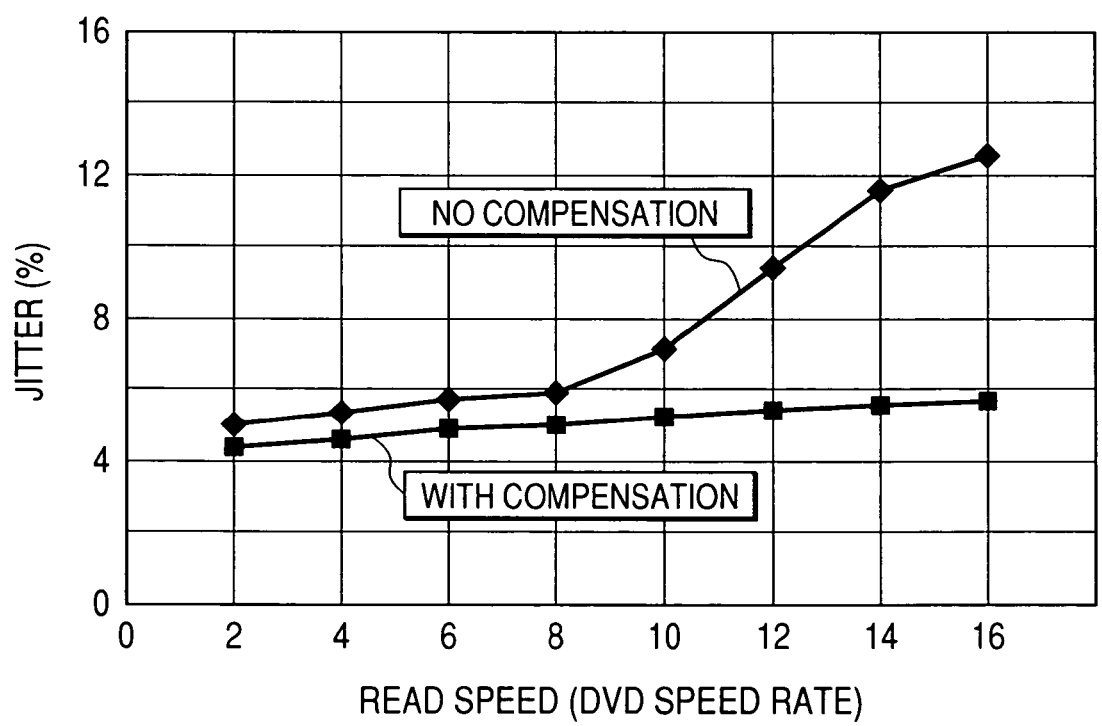
FIG. 20 shows measurement results of the jitter values by reproducing the track written at 2× speed in the speed range between 2× to 16× with the evaluation device of NA set to 0.60.

FIG. 20 shows the results of measuring the jitter values using the evaluating device with NA of 0.60 while reproducing the track written at the 2× speed in the speed range between 2× and 16× speeds. As performances of the optical disk device and media become higher, the write/read speed increases. It is essential to assure the readout compatibility during the trial writing for optimizing the write pulse shape and power. Meanwhile, as the same track is read at higher speeds, the jitter value increases owing to the factors below:
(1) decrease in the S/N ratio as the increase in the influence of noise both of the amplifier and laser; and
(2) relative increase in the group delay in accordance with the band characteristic of the I-V amplifier. With respect to the factor (1), the decreased S/N ratio may be recovered to a certain degree by introducing the PRML technique. The factor (2) may cause the problem as described above from the aspect of the readout compatibility. In order to realize writing at the speed in excess of 8× especially on the DVD, the rotating control at CAV mode has to be employed at least partially. It is necessary to set the write pulse shape and power so as to realize excellent writing in the wide linear speed range. The drawing represents results of two cases where the readout is performed under the standard equalizing condition for the DVD-RAM, and the tap coefficient of the FIR filter is adaptively changed. Under the standard equalizing condition for the DVD-RAM, the writing speed is specified to 2×. The measurement was made such that the frequency characteristic changes in proportion to the readout speed while keeping the equalizing boost amount constant. Under the standard equalizing condition, the jitter value of approximately 5% at the 2× speed is increased to exceed 12% upon the readout at the 16× speed. Meanwhile, in the case where the automatic equalization is performed by the FIR filter to mainly compensate the group delay, the jitter value may be set to 6% or less upon the readout at the speed 16×.

Figure 21:
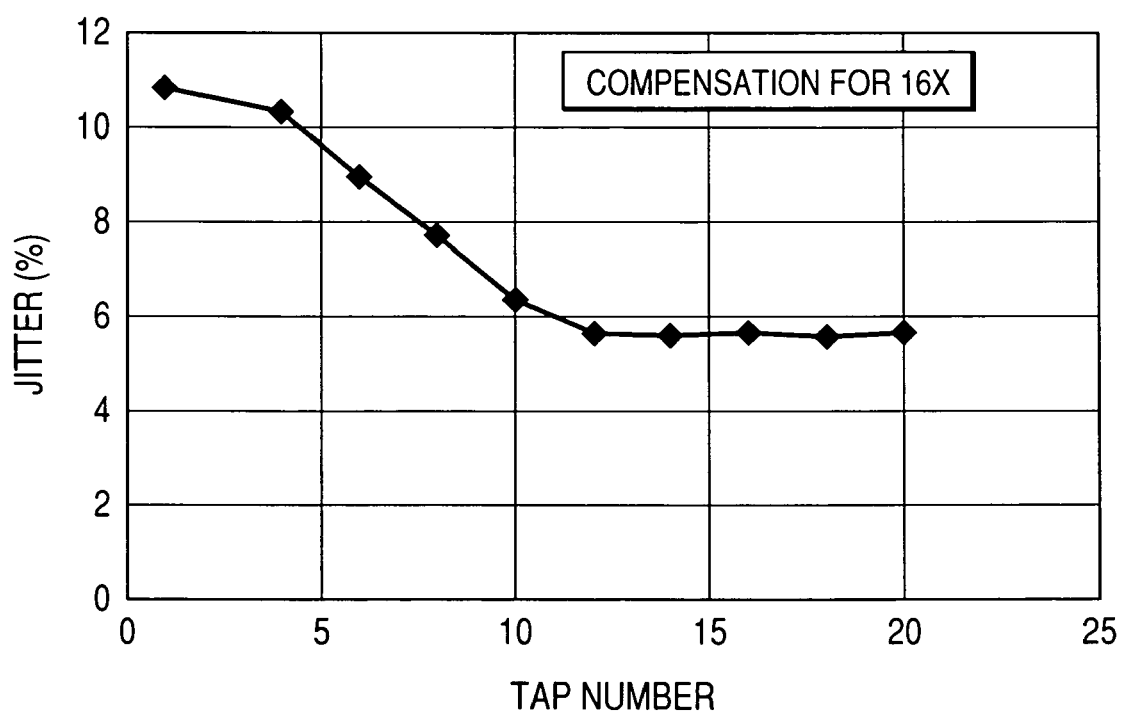
FIG. 21 shows experimental results of measuring the relationship between the tap number of the FIR filter for compensating the readout at 16×, and the jitter value.

FIG. 21 shows the experimental results of measuring the relationship between the tap number of the FIR filter for compensating the readout at 16× speed and the jitter values. The process for obtaining the tap coefficient has been described as above. Referring to the drawing, when the tap number becomes 5 or larger, the jitter value starts decreasing significantly. When the tap number becomes 10 or larger, it stops decreasing. As the desired tap number is different depending on the model of the optical disk device, the appropriate value has to be selected.

Figure 22:
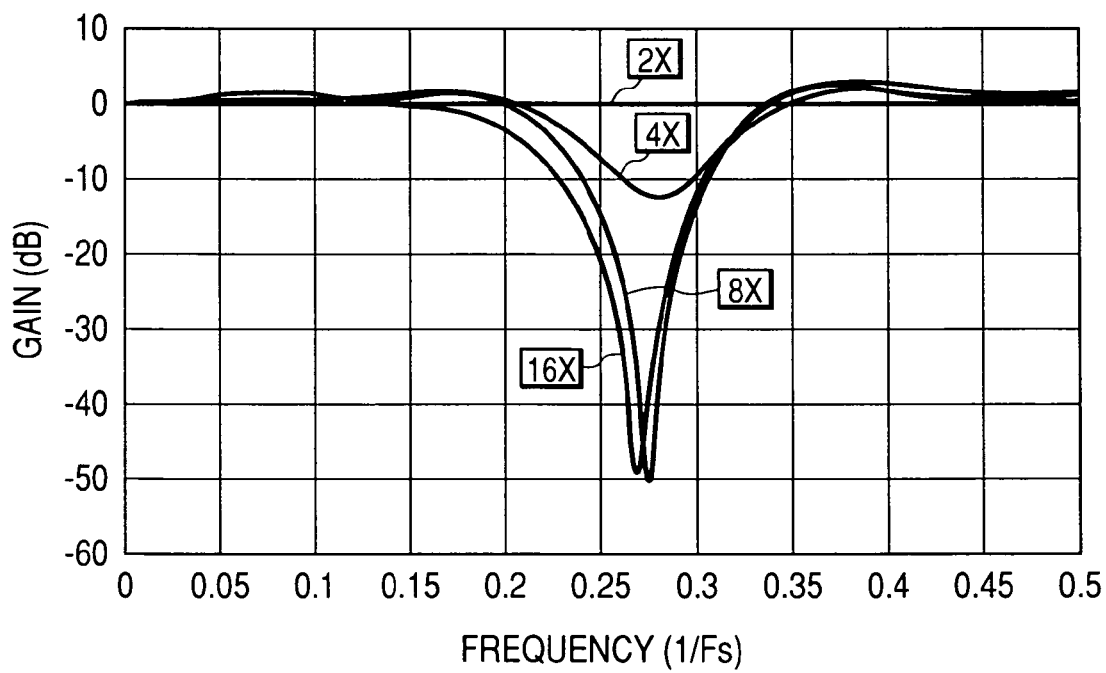
FIG. 22 shows frequency characteristics of the FIR filters for compensating the readout.

FIG. 22 graphically shows the frequency characteristic of the FIR filter for compensating the readout. The drawing shows frequency characteristics of the FIR filter at the respective speeds of 2×, 4×, 8×, and 16×. As the FIR filter is operated in synchronization with the channel clock, the frequency represented as the x-axis is normalized with the channel clock. The frequency of the repetitive signal of the minimum run length (3T) is set to 0.167. As the 2× speed is the basis for write/read, the FIR filter is structured to allow the readout signal to pass therethrough. Specifically, the coefficient of the center tap is only set to 1, and other coefficients are set to 0 as aforementioned. Each frequency characteristic of the FIR filter varies depending on the respective speeds. The difference in the characteristic at the frequency of 0.167 or lower is different so as to compensate mainly the group delay. The minimum value of the gain obtained around the frequency of 0.25 exhibits the low pass filter effect, thus improving the S/N ratio.

Figure 23A:
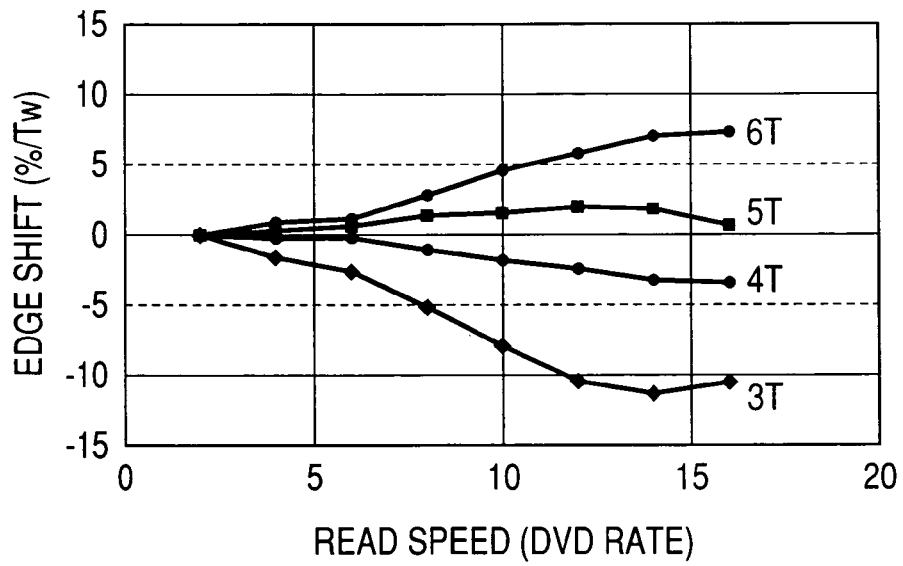
FIG. 23 shows experimental results representing the effect of suppressing the group delay of the FIR filters for compensating the readout.
Figure 23B:
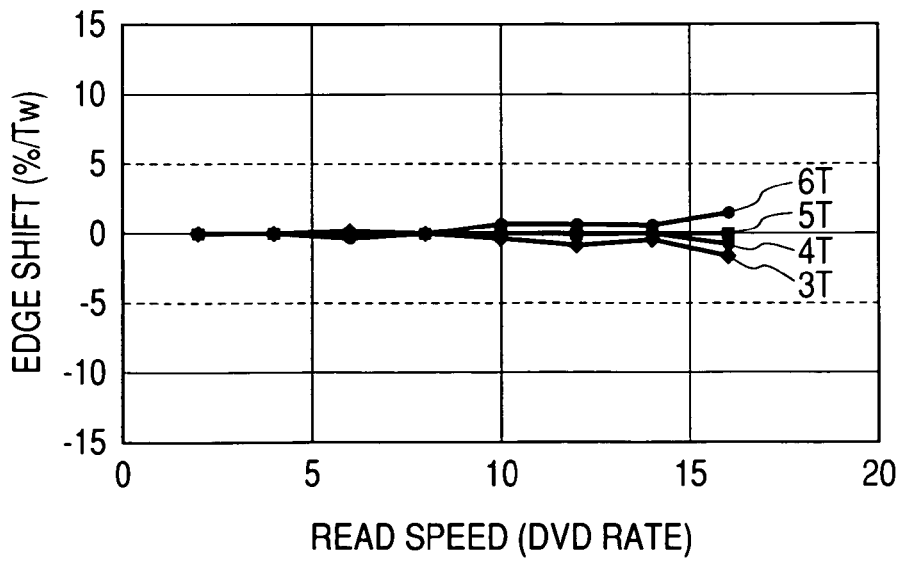

FIG. 23 shows the experimental results representing the effect resulting from suppression of the group delay with the FIR filter for the readout compensation. FIG. 23A shows the experimental results under the standard equalization condition. The edge shift on the y-axis of the graph is obtained by averaging the measurement results of the edge shifts at the respective 4×4 patterns with respect to the mark lengths of 3T, 4T, 5T and 6T. Based on the 2× speed, the edges shift by −10% with 3T, +7% with 6T at the 16× speed. The aforementioned results fail to satisfy the condition of 5% for write/read compatibility as described above. Meanwhile, in the case where the readout is compensated with the FIR filter, the edge shift amount is kept substantially constant in the speed range between 2× and 16×, while satisfying the condition of 5% or lower for the readout compatibility.

Figure 24:
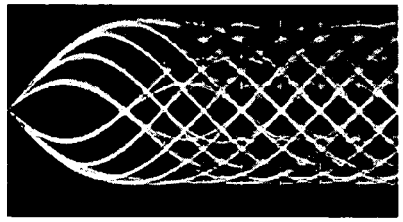
FIG. 24 graphically shows the measurement results of the jitter values and the bit error rates at both speeds of 6× and 16×, respectively.
Figure 24:
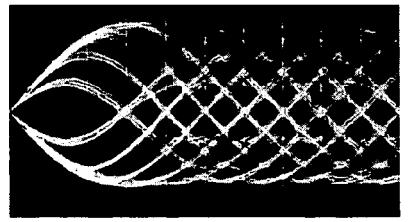
Figure 24:
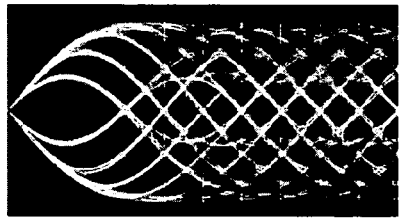
Figure 24:
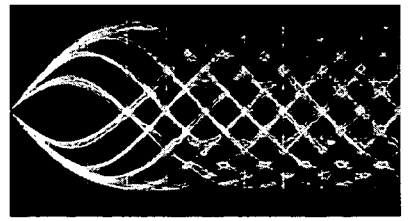

FIG. 24 shows the measurement results of the jitter values and bit error ratios at speeds of 6× and 16×, respectively. The bit error ratio was measured by PR (3, 4, 4, 3)ML. In this case, the resultant bit error rate at the level ranging between 10 and 6 is obtained even after 10 times of overwriting.

Third Embodiment

Optical Disk Device

Figure 25:
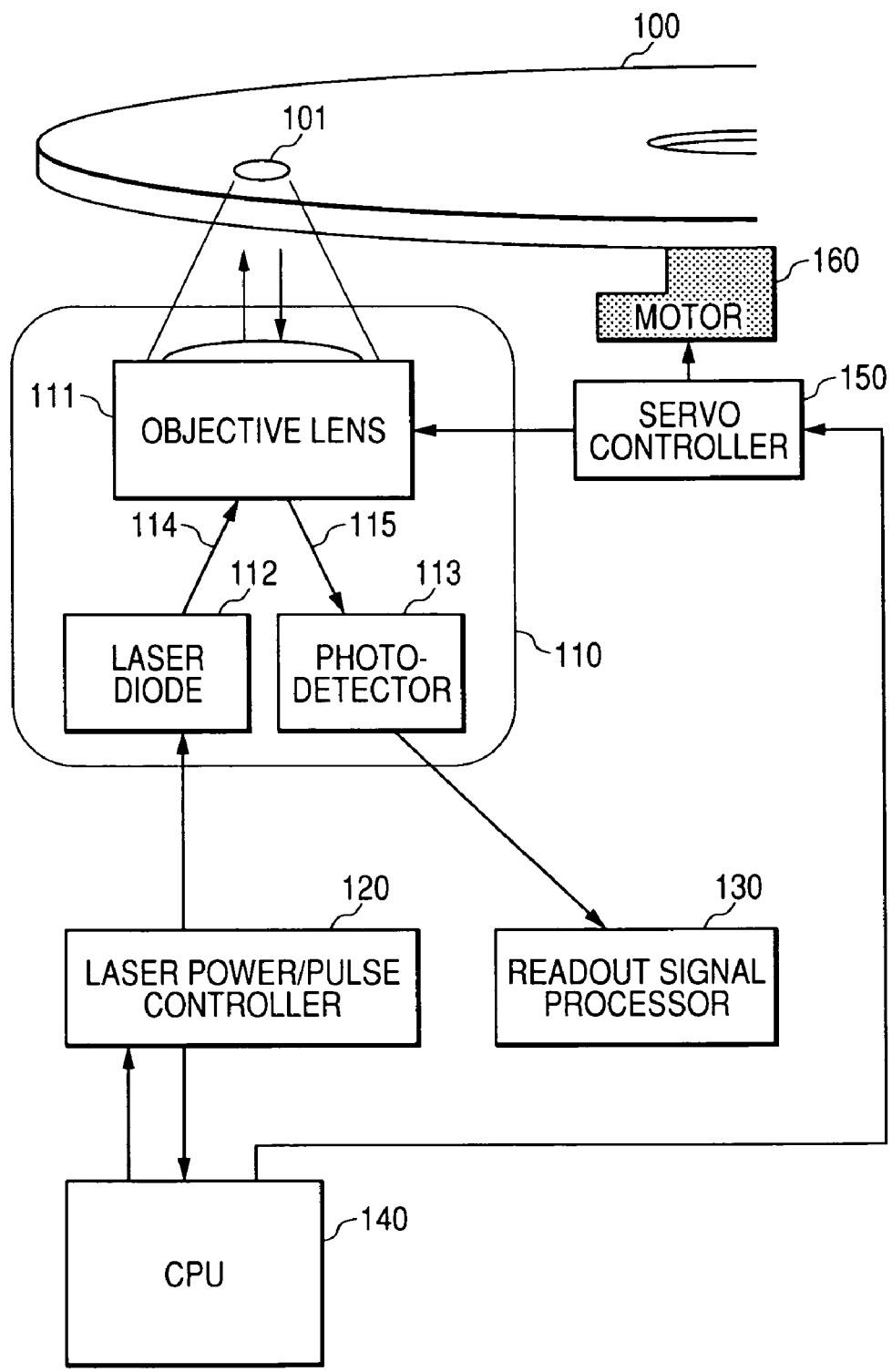
FIG. 25 shows the structure of an optical disk device according to the embodiment of the present invention.

FIG. 25 is a view of an embodiment that shows a structure of an optical disk device according to the present invention. An optical disk medium 100 is rotated by a motor 160. Upon readout, a laser power/pulse controller 120 controls electricity applied to a laser diode 112 within an optical head 110 to generate a laser beam such that the light intensity reaches the level commanded by the CPU 140. The laser beam 114 is collected by an objective lens 111 to form an optical spot 101 on the optical disk medium 100. The reflecting light 115 from the optical spot 101 is detected by a photo-detector 113 via the objective lens 111. The photo-detector is formed of a plurality of divided optical detection elements. A readout signal processor 130 readouts the information written on the optical disk medium 100 using the signal detected by the optical head 110. Upon writing, the laser power/pulse controller 120 converts predetermined write data into a predetermined write pulse current such that the control is executed to have the laser diode 112 irradiating the pulsed light. The circuit structures according to the present invention shown in FIGS. 1 and 9 are installed in the readout signal processor 130. The evaluation of the readout signal quality and the sequence for optimizing the write pulse shape and power will be executed as the program within the CPU 140. Those structures provide the optical disk device according to the present device.

The present invention is employed for a high-capacity optical disk device.

What is claimed is:
1. An optical disk device comprising:
a light source configured to irradiate a laser pulse onto an optical disk medium on which information data are written;
a unit configured to generate a readout signal based on a data pattern written on the optical disk medium, by irradiating a light ray from the light source onto the optical disk medium and detecting resulting reflected light;
an A/D converter, configured to convert the readout signal into a readout signal bit stream, and controlled by edges of a clock signal;
a binarizing circuit configured to generate binarized information data based on the readout signal bit stream;
a digital PLL (Phase Locked Loop) circuit configured to detect binarized information data corresponding to a phase difference between an edge point of the readout signal bit stream and an edge point of the clock signal, and configured to allow a frequency of the clock signal to be adjusted so as to bring the phase difference to be close to zero;
an FIR (Finite Impulse Response) filter having an even tap number; and
an edge detection unit;
wherein the A/D converter is configured to perform an A/D conversion at a timing that is shifted a half of a clock signal, in order to interpose an edge point of the data pattern of the readout signal bit stream;

wherein the FIR filter is configured to perform one of equalization and phase compensation of the readout signal bit stream, in order to generate an equalized readout signal bit stream with a data point corresponding to the edge point of the data pattern of the readout signal bit stream;

wherein the edge detection unit is configured to detect the edge point of the equalized readout signal bit stream;

wherein an accumulating unit is configured to accumulate at least one of a data value of the edge point and an absolute value thereof, for a predetermined period, in order to obtain at least one of (i) an equalized edge shift value and (ii) an equalized jitter value; and wherein a determination unit is configured to determine a pulse condition of the laser pulse in order to selectively minimize at least one of (i) the equalized edge shift value and (ii) the equalized jitter value, or to make at least one of (i) the equalized edge shift value and (ii) the equalized jitter value smaller than a predetermined value.

2. The optical disk device according to claim 1, wherein when an edge in the equalized readout signal bit stream is a leading edge or a trailing edge, as determined by the determining unit based on a pattern of a mark length data and space length data, the accumulating unit sorts, accumulates, and stores in a memory unit: (1) the data value of the edge point, (2) the absolute value of the data value of the edge point, and (3) a number of patterns that have occurred.

3. The optical disk device according to claim 2, wherein a parameter of the pulse condition and the data value of the edge point are corresponded one on one.

4. The optical disk device according to claim 2,
wherein an edge in the equalized readout signal bit stream is determined to be a leading edge when a sequence of marks having space length larger than or equal to a predetermined value also has a sequence of increasing TSFP (Tsp, Tmk) edge shift values; and
wherein an edge in the equalized readout signal bit stream is determined to be a trailing edge when a sequence of marks having space length larger than or equal to a predetermined value also has a sequence of increasing TELP (Tsp, Tmk) edge shift values.

5. The optical disk device according to claim 4,
wherein a TSFP (Tsp, Tmk) edge shift value represents the edge shift of a leading edge of a mark having the previous space length of Tsp and the mark length of Tmk; and
wherein a TELP (Tsp, Tmk) edge shift value represents the edge shift of a readout signal of a trailing edge of a mark having a mark length of Tmk and a subsequent space length of Tsp.

6. The optical disk device according to claim 1, wherein:
the binarizing circuit comprises a Viterbi decoder having an even numbered constraint length;
the FIR filter comprises a digital equalizer having a variable tap coefficient;
the equalized readout signal bit stream is input to the Viterbi decoder; and
the digital equalizer is commonly used by selecting the tap coefficient of the FIR filter between a case for determining a write laser pulse condition and a case for performing a normal data readout.

7. The optical disk device according to claim 1, wherein the tap number of the FIR filter is equal to or larger than 4.

8. The optical disk device according to claim 1, wherein:
the FIR filter comprises a digital equalizer with a variable tap coefficient; and
reading at 4× speed on a DVD-RAM is performed.

9. The optical disk device according to claim 1,
wherein said accumulating unit is configured to accumulate at least one of a data value of the edge point and an absolute value thereof, for a predetermined period, in order to obtain an equalized edge shift value, and said determination unit is configured to determine a pulse condition of the laser pulse in order to selectively minimize the equalized edge shift value, or to make the equalized edge shift value smaller than a predetermined value.

10. The optical disk device according to claim 9, wherein a pulse condition of the laser pulse is determined to selectively minimize the equalized edge shift value.

11. The optical disk device according to claim 9, wherein a pulse condition of the laser pulse is determined to make the equalized edge shift value smaller than a predetermined value.

12. The optical disk device according to claim 1, wherein said accumulating unit is configured to accumulate at least one of a data value of the edge point and an absolute value thereof, for a predetermined period, in order to obtain an equalized jitter value, and said determination unit is configured to determine a pulse condition of the laser pulse in order to selectively minimize the equalized jitter value, or to make the equalized jitter value smaller than a predetermined value.

13. The optical disk device according to claim 12, wherein a pulse condition of the laser pulse is determined to selectively minimize the equalized jitter value.

14. The optical disk device according to claim 12, wherein a pulse condition of the laser pulse is determined to make the equalized jitter value smaller than a predetermined value.

15. An optical disk device comprising:
a light source configured to irradiate a laser pulse onto an optical disk medium on which information data are written;
a unit configured to generate a readout signal based on a data pattern written on the optical disk medium, by irradiating a light ray from the light source onto the optical disk medium and detecting resulting reflected light;
an A/D converter, controlled by edges of a clock signal, configured to convert the readout signal into a readout signal bit stream, and configured to perform an A/D conversion at a timing that is shifted a half of a clock signal in order to interpose an edge point of the data pattern of the readout signal bit stream;
a binarizing circuit configured to generate binarized information data based on the readout signal bit stream;
a digital PLL (Phase Locked Loop) circuit configured to detect binarized information data corresponding to a phase difference between an edge point of the readout signal bit stream and an edge point of the clock signal, and configured to allow a frequency of the clock signal to be adjusted so as to bring the phase difference to be close to zero;
an FIR (Finite Impulse Response) filter having an even tap number, and configured to perform one of equalization and phase compensation of the readout signal bit stream, in order to generate an equalized readout signal bit stream with a data point corresponding to the edge point of the data pattern of the readout signal bit stream;
an edge detection unit configured to detect the edge point of the equalized readout signal bit stream;

an accumulating unit is configured to accumulate at least one of a data value of the edge point and an absolute value thereof, for a predetermined period, in order to obtain at least one of (i) an equalized edge shift value and (ii) an equalized jitter value; and a determination unit is configured to determine a pulse condition of the laser pulse in order to selectively minimize at least one of (i) the equalized edge shift value and (ii) the equalized jitter value, or to make at least one of (i) the equalized edge shift value and (ii) the equalized jitter value smaller than a predetermined value.

16. The optical disk device according to claim 15, wherein when an edge in the equalized readout signal bit stream is a leading edge or a trailing edge, as determined by the determining unit based on a pattern of a mark length data and space length data, the accumulating unit sorts, accumulates, and stores in a memory unit: (1) the data value of the edge point, (2) the absolute value of the data value of the edge point, and (3) a number of patterns that have occurred.

17. The optical disk device according to claim 16,
wherein an edge in the equalized readout signal bit stream is determined to be a leading edge when a sequence of marks having space length larger than or equal to a predetermined value also has a sequence of increasing TSFP (Tsp, Tmk) edge shift values; and
wherein an edge in the equalized readout signal bit stream is determined to be a trailing edge when a sequence of marks having space length larger than or equal to a predetermined value also has a sequence of increasing TELP (Tsp, Tmk) edge shift values.

18. An optical disk device comprising:
a light source configured to irradiate a laser pulse onto an optical disk medium on which information data are written;
a unit configured to generate a readout signal based on a data pattern written on the optical disk medium, by irradiating a light ray from the light source onto the optical disk medium and detecting resulting reflected light;
an A/D converter, controlled by edges of a clock signal, configured to convert the readout signal into a readout signal bit stream, and configured to perform an A/D conversion at a timing that is shifted a half of a clock signal in order to interpose an edge point of the data pattern of the readout signal bit stream;
a binarizing circuit configured to generate binarized information data based on the readout signal bit stream;
a digital PLL (Phase Locked Loop) circuit configured to detect binarized information data corresponding to a phase difference between an edge point of the readout signal bit stream and an edge point of the clock signal, and configured to allow a frequency of the clock signal to be adjusted so as to bring the phase difference to be close to zero;
an FIR (Finite Impulse Response) filter having an even tap number, and configured to perform one of equalization and phase compensation of the readout signal bit stream, in order to generate an equalized readout signal bit stream with a data point corresponding to the edge point of the data pattern of the readout signal bit stream;
an edge detection unit configured to detect the edge point of the equalized readout signal bit stream;
a means for accumulating at least one of a data value of the edge point and an absolute value thereof, for a predetermined period, in order to obtain at least one of (i) an equalized edge shift value and (ii) an equalized jitter value; and
a means for determining a pulse condition of the laser pulse in order to selectively minimize at least one of (i) the equalized edge shift value and (ii) the equalized jitter value, or to make at least one of (i) the equalized edge shift value and (ii) the equalized jitter value smaller than a predetermined value.

19. The optical disk device according to claim 18, wherein when an edge in the equalized readout signal bit stream is a leading edge or a trailing edge, as determined by the determining means based on a pattern of a mark length data and space length data, the means for accumulating sorts, accumulates, and stores in a memory unit: (1) the data value of the edge point, (2) the absolute value of the data value of the edge point, and (3) a number of patterns that have occurred.

20. The optical disk device according to claim 19,
wherein an edge in the equalized readout signal bit stream is determined to be a leading edge when a sequence of marks having space length larger than or equal to a predetermined value also has a sequence of increasing TSFP (Tsp, Tmk) edge shift values; and
wherein an edge in the equalized readout signal bit stream is determined to be a trailing edge when a sequence of marks having space length larger than or equal to a predetermined value also has a sequence of increasing TELP (Tsp, Tmk) edge shift values.

* * * * *